(12) United States Patent
Wang et al.

(10) Patent No.: US 12,345,341 B2
(45) Date of Patent: Jul. 1, 2025

(54) CONTROL VALVE

(71) Applicant: ZHEJIANG SANHUA AUTOMOTIVE COMPONENTS CO., LTD., Zhejiang (CN)

(72) Inventors: Lixin Wang, Zhejiang (CN); Long Lin, Zhejiang (CN); Yun Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 38 days.

(21) Appl. No.: 18/555,555

(22) PCT Filed: Apr. 15, 2022

(86) PCT No.: PCT/CN2022/087032
§ 371 (c)(1),
(2) Date: Oct. 16, 2023

(87) PCT Pub. No.: WO2022/218404
PCT Pub. Date: Oct. 20, 2022

(65) Prior Publication Data
US 2024/0200673 A1 Jun. 20, 2024

(30) Foreign Application Priority Data
Apr. 16, 2021 (CN) .......................... 202110411383.1

(51) Int. Cl.
*F16K 11/08* (2006.01)
*F16K 11/085* (2006.01)

(52) U.S. Cl.
CPC ................................ *F16K 11/0856* (2013.01)

(58) Field of Classification Search
CPC .................................................. F16K 11/0856
See application file for complete search history.

(56) References Cited

U.S. PATENT DOCUMENTS 2,641,280 A * 6/1953 Fleischhauer ........ A01G 25/162
251/16
3,827,548 A 8/1974 Matsuo
(Continued)

FOREIGN PATENT DOCUMENTS

CN 103791114 A 5/2014
CN 207905916 U 9/2018
(Continued)

OTHER PUBLICATIONS

Japanese first Office Action issued on Nov. 19, 2024 for the Japanese counterpart application No. 2023-563234.
(Continued)

*Primary Examiner* — Kevin R Barss
(74) *Attorney, Agent, or Firm* — Yue (Robert) Xu; Apex Attorneys at Law, LLP

(57) ABSTRACT

A control valve includes a valve body and a valve core; the valve body comprises a side wall part; the control valve has a valve cavity, the control valve comprises at least five channels, one end of each channel is in communication with the valve cavity, and the other end forms a valve port of the control valve; the valve core includes an internal guide passage cavity, a plurality of external guide passage cavities, a first separation plate, and a second separation plate; the first separation plate is located between the internal guide passage cavity and an external guide passage cavity, and the second separation plate is located between two adjacent external guide passage cavities; the first separation plate has a communication hole, and the internal guide passage cavity is in communication with a portion of the external guide passage cavities by means of the communication hole.

20 Claims, 21 Drawing Sheets

(56) References Cited

U.S. PATENT DOCUMENTS

| | | | | |
|---|---|---|---|---|
| 3,874,413 A | * | 4/1975 | Valdez | F16K 11/072 |
| | | | | 210/341 |
| 5,133,385 A | | 7/1992 | Kawakami | |
| 5,343,893 A | * | 9/1994 | Hogan | A61H 9/0078 |
| | | | | 137/625.11 |
| 8,905,076 B2 | | 12/2014 | Jorgensen | |
| 10,215,452 B2 | * | 2/2019 | Ogawa | F16K 11/076 |
| 10,330,208 B2 | * | 6/2019 | Takamatsu | F16K 27/06 |

FOREIGN PATENT DOCUMENTS

| | | |
|---|---|---|
| CN | 110529628 A | 12/2019 |
| CN | 110901755 A | 3/2020 |
| CN | 111173959 A | 5/2020 |
| CN | 211567601 U | 9/2020 |
| CN | 212928859 U | 4/2021 |
| EP | 2075421 A1 | 7/2009 |
| JP | S4948076 A | 5/1974 |
| JP | H04203681 A | 7/1992 |

OTHER PUBLICATIONS

International Search Report for PCT/CN2022/087032 mailed Jul. 1, 2022, ISA/CN.

* cited by examiner

CONTROL VALVE

The present application is a National Phase entry of PCT Application No. PCT/CN2022/087032, filed on Apr. 15, 2022, which claims priority to Chinese Patent Application No. 202110411383.1, titled "CONTROL VALVE", filed on Apr. 16, 2021 with the China National Intellectual Property Administration, which are incorporated herein by reference in their entireties.

FIELD

The present application relates to the technical field of fluid control, and in particular to a control valve.

BACKGROUND

Some systems need to use a multi-path control valve to control flow paths, such as a motor vehicle. At present, multiple control valves may generally be used for control. If one control valve can be provided to control fluid of multiple flow paths, it is convenient and compact when the control valve is used.

SUMMARY

The purpose of the present application is to provide a control valve that can realize fluid control on multiple flow paths, so that it is convenient and compact when the control valve is used.

A control valve is provided according to an embodiment of the present application. The control valve includes a valve body and a valve core, the valve body includes a side wall part, the control valve has a valve cavity, the side wall part is a peripheral wall of the valve cavity or at least part of the peripheral wall of the valve cavity, at least part of the valve core is arranged in the valve cavity and is configured to be driven to rotate, the control valve has at least five channels, one end of each of the at least five channels penetrates through the side wall part, the other end of each of the at least five channels forms a valve port of the control valve, the valve core comprises an inner communication cavity, multiple outer communication cavities, a first partition, and a second partition, the multiple outer communication cavities are distributed on an outer side of the inner communication cavity, the first partition is located between the inner communication cavity and the plurality of outer communication cavities, and the second partition is located between two adjacent outer communication cavities and isolates the outer communication cavity;

the first partition has a communication hole, and the inner communication cavity communicates with part of the multiple outer communication cavities through the communication hole; and the at least five channels of the control valve includes a first flow channel and multiple second flow channels, the first flow channel is configured to communicate with the outer communication cavity through the inner communication cavity and the communication hole, and the second flow channel is configured to communicate with the outer communication cavity.

According to the control valve provided by the embodiment of the present application, the valve core includes the inner communication cavity, the multiple outer communication cavities, the first partition and the second partition. The first partition is located between the inner communication cavity and the outer communication cavities, which can separate the inner communication cavity and the outer communication cavities. The first partition has the communication hole, so that the inner communication cavity communicates with part of the outer communication cavities. The second partition is located between two adjacent outer communication cavities to separate each of the outer communication cavities into an independent space. In the implementation of the present application, a corresponding valve port can be opened or closed through the outer communication cavity and the second flow channel by rotation of the valve core, and/or the corresponding valve port can be opened or closed through the first flow channel, the inner communication cavity, the communication hole, and the outer communication cavity by rotation of the valve core. The control valve can realize different communication modes between multiple valve ports, so that one control valve can control multiple flow paths, and it is convenient and compact when the control valve is used.

DETAILED DESCRIPTION OF EMBODIMENTS

Features and exemplary embodiments of various aspects of the present application are described in detail below. In order to make the purposes, technical solutions and advantages of the present application clearer, the present application is further described in detail below in conjunction with the drawings and specific embodiments. In this specification, relational terms such as "first" and "second" are only used to distinguish one element from another element with a same name, and do not necessarily require or imply any actual relationship or order between the elements.

Figure 1:
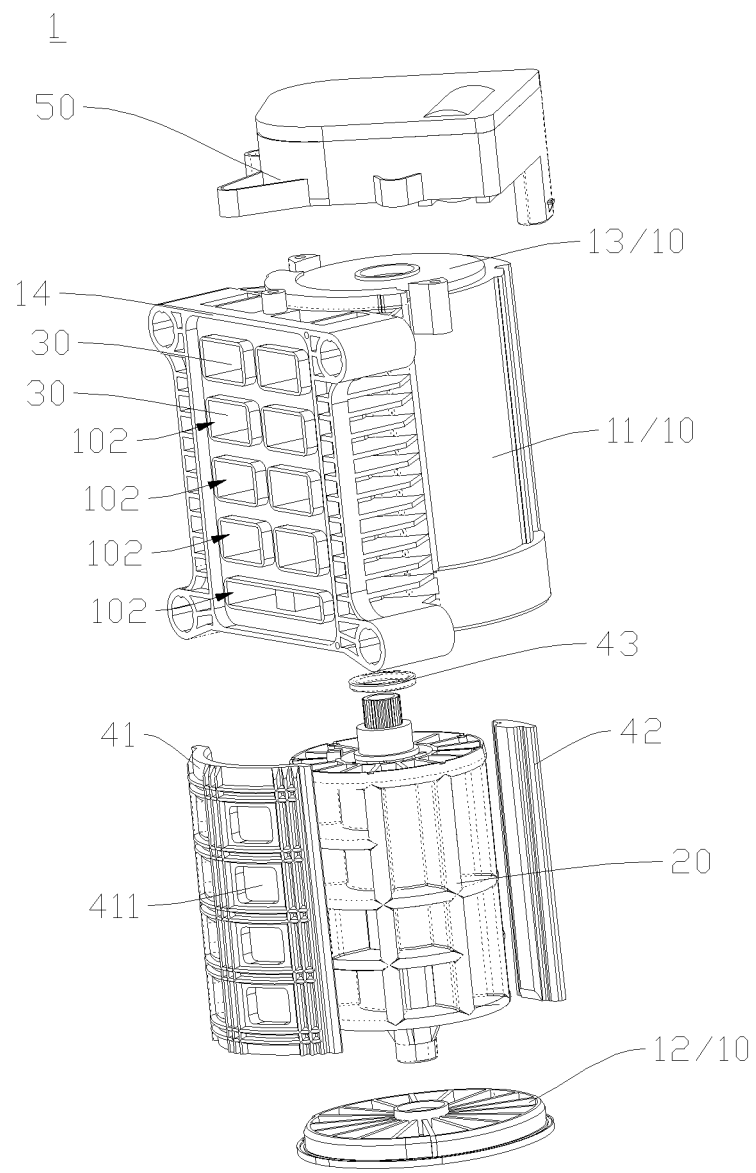
FIG. 1 is a schematic diagram of an explosive structure of a control valve provided according to a first embodiment of the present application.
Figure 2:
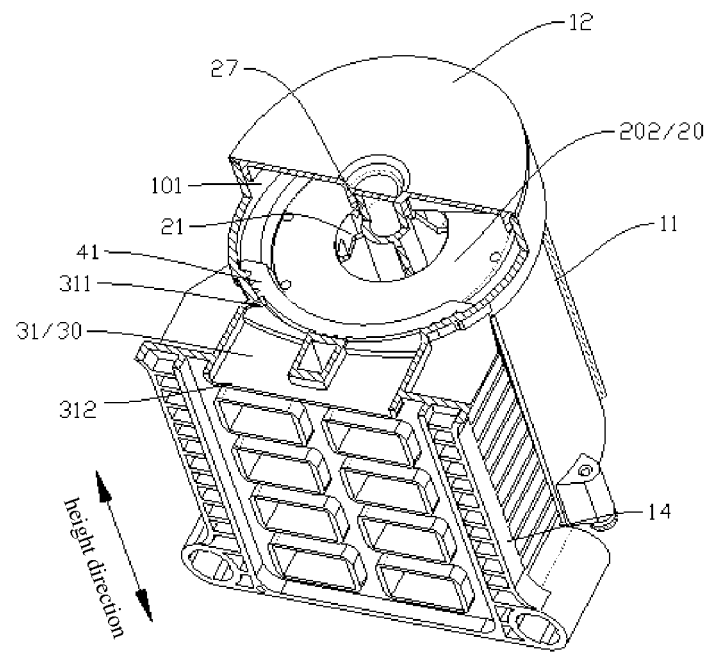
FIG. 2 is a schematic diagram of a partial cross-sectional structure of the control valve shown in FIG. 1 at a position.
Figure 3:
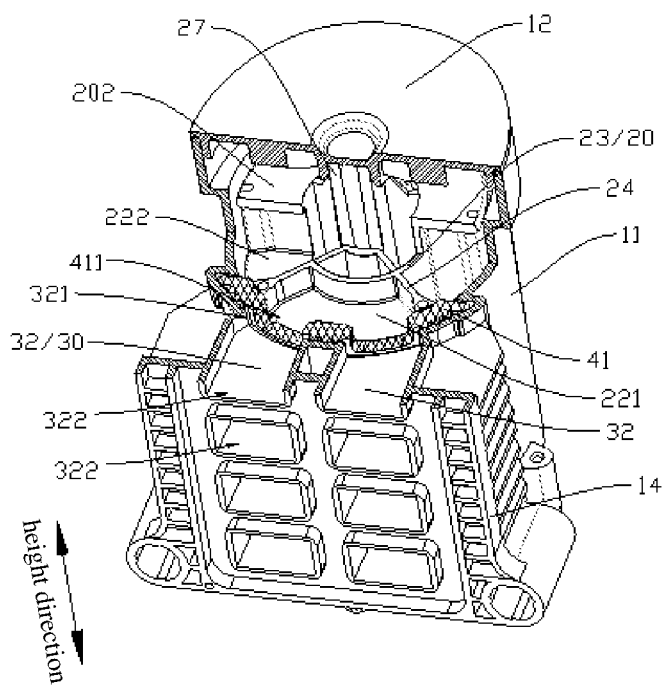
FIG. 3 is a schematic diagram of a partial cross-sectional structure of the control valve shown in FIG. 1 at another position.

As shown in FIGS. 1 to 3, a control valve 1 is provided according to an embodiment of the present application. The control valve 1 includes a valve body 10, a valve core 20, and a first seal 41. The valve body 10 includes a side wall part 11, and the control valve 1 has a valve cavity 101. The side wall part 11 is a peripheral wall of the valve cavity 101 or at least part of the peripheral wall of the valve cavity 101. The first seal 41 is arranged between the valve core 20 and the side wall part 11 along a radial direction of the valve core 20, and the valve core 20 is configured to be driven to rotate. The control valve 1 may further include a driving device 50 and a sealing ring 43. The driving device 50 includes a driving element, and the driving element may be a motor or a motor and a reduction gear set. The valve core 20 is configured to be driven to rotate by the driving element in the driving device 50. In FIG. 1, the valve body 10 further includes a bottom wall part 12 and a top wall part 13. The bottom wall part 12, the top wall part 13, and the side wall part 11 form part of a wall of the valve cavity 101, and the sealing ring 43 is arranged between the top wall part 13 and the valve core 20. At least part of the side wall part 11 is located between the bottom wall part 12 and the top wall part 13. One of the bottom wall part 12 and the top wall part 13 is integrally formed with the side wall part 11, and the other one of the bottom wall part 12 and the top wall part 13 is sealedly connected with the side wall part 11. For example, in FIG. 1, the top wall part 13 is integrally formed with the side wall part 11, and the bottom wall part 12 may be fixedly connected to and sealedly connected with the side wall part 11 through a welding process to prevent fluid leakage. The sealing ring 43 is arranged between the top wall part 13 and the valve core 20. During the assembly process, the valve core 20 is assembled from a bottom of the valve body 10 towards a top of the valve body 10 to reduce the deformation of the sealing ring 43 and improve the sealing performance of the sealing ring 43. The control valve 1 includes at least five channels 30, one end of each of the at least five channels 30 penetrates the side wall part 11 and communicates with the valve cavity 101, and the other end of each of the at least five channels 30 forms a valve port 102 of the control valve 1, and fluid can enter or leave the control valve 1 from the valve port 102.

As shown in FIG. 1, a cross section of the first seal 41 is of an arc-shaped structure. Both sides of the first seal 41 in a circumferential direction of the first seal 41 have limiting surfaces, the side wall part 11 of the valve body 10 has a matching surface, and the limiting surfaces and the matching surface abut against each other to limit the first seal 41. Since the cross section of the first seal 41 is of an arc-shaped structure, it is easy to cause an eccentricity of the valve core 20 while the valve core 20 presses the first seal 41, which affects the rotation of the valve core 20. In the embodiment of the present application, the control valve 1 may further include a second seal 42. The second seal 42 and the first seal 41 are respectively arranged on both sides of the valve core 20 in the radial direction of the valve core 20, so that both the second seal 42 and the first seal 41 apply forces to the valve core 20 to keep the valve core 20 coaxial with the side wall part 11, which improves the rotation stability of the valve core 20. At least part of the first seal 41 and at least part of the second seal 42 may be made of rubber material, for example, each of the first seal 41 and the second seal 42 includes an elastic member and a sealing member that are fixedly connected, the elastic member may be formed by processing the rubber material, and the sealing component may be formed by processing Teflon.

In order to facilitate the assembly of the control valve 1 with other components in a fluid control system and improve the integration degree of the control valve 1 and other components, in some embodiments, as shown in FIGS. 1 to 3, the valve body 10 further includes an mounting part 14, and the mounting part 14 is fixedly connected to the side wall part 11. For example, the mounting part 14 and the side wall part 11 may be integrally formed, the mounting part 14 has a mounting surface, and the valve ports 102 of the control valve 1 penetrates through the mounting surface, so that the valve ports 102 of the control valve 1 are formed on the mounting surface and orientations of the valve ports 102 are same, which can relatively simplify assembly steps of the control valve 1 and other components, reduce leakage points of connecting parts, and improve the reliability of sealing. The first seal 41 has openings 411 in one-to-one correspondence with the valve ports 102, and communication cavities of the valve core 20 communicates with the valve ports 102 through the openings 411 of the first seal 41.

As shown in FIGS. 3 to 6, a main body of the valve core 20 is of a columnar structure, and the valve core 20 includes a top plate 201, a bottom plate 202, an inner communication cavity 21, multiple outer communication cavities 22, a first partition 23, and a second partition 24. Along a height direction of the valve core 20, the multiple outer communication cavities 22, the first partition 23, and the second partition 24 are located between the top plate 201 and the bottom plate 202, and the inner communication cavity 21 is located between the top plate 201 and the bottom plate 202 and penetrates through the bottom plate 202. At least part of the outer communication cavities 22 are distributed on an outer peripheral side of the inner communication cavity 21, the first partition 23 is located between the inner communication cavity 21 and the outer communication cavities 22, and the second partition 24 is located between two adjacent outer communication cavities 22. A main body of the first partition 23 is of a hollow cylinder structure. The first partition 23 has a communication hole 231, and the inner communication cavity 21 communicates with part of the outer communication cavities 22 through the communication hole 231. Each outer communication cavity 22 is separated into an independent space by the second partition 24. At least two valve ports 102 corresponding to the outer communication cavity 22 can be communicated or cut off through one outer communication cavity 22 by rotation of the valve core 20, and/or at least two corresponding valve ports 102 can be communicated or cut off through the inner communication cavity 21, the communication hole 231, and the outer communication cavity 22 by rotation of the valve core 20, at least one of the at least two valve ports 102 corresponds to the inner communication cavity 21, and at least one of the other of the at least two valve ports 102 corresponds to the outer communication cavity 22. Through the above arrangement, one control valve 1 can control multiple flow paths, which is convenient and compact in use.

Figure 5:
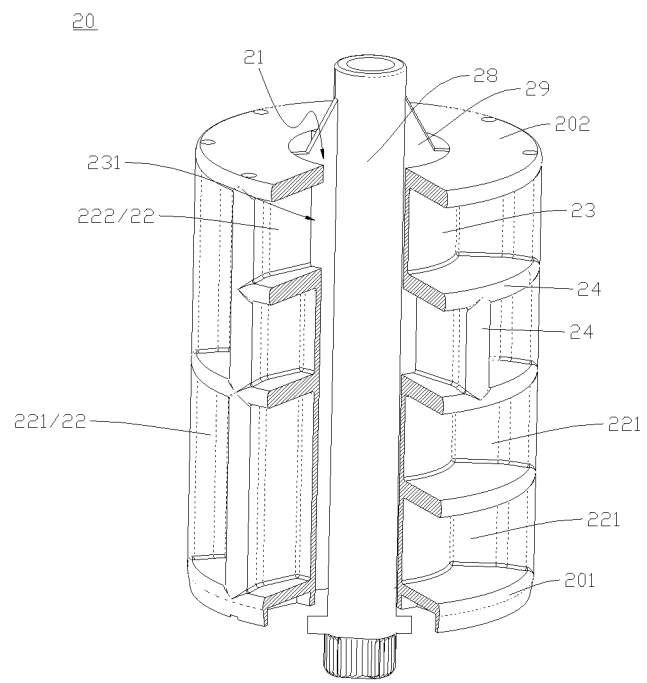
FIG. 5 is a three-dimensional schematic diagram of a cross-sectional structure of the valve core shown in FIG. 4 at a position.

Further referring to FIG. 5, in some embodiments, the valve core 20 further includes a connection column 28 and a connection rib 29. The connection column 28 is of a hollow cylinder structure, and the inner communication cavity 21 is formed between an outer surface of the connection column 28 and an inner surface of the first partition 23. The connection rib 29 is connected between the outer surface of the connection column 28 and the inner surface of the first partition 23 to improve the structural strength of the valve core 20.

Figure 6:
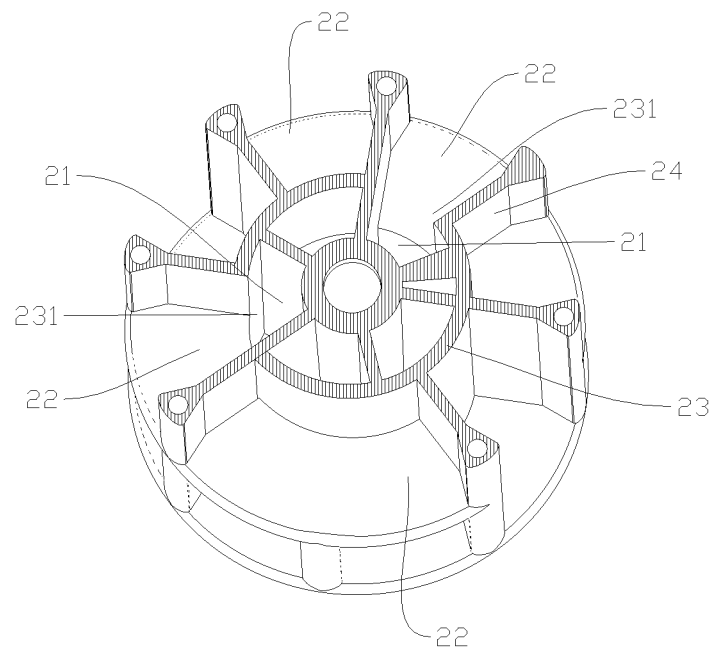
FIG. 6 is a three-dimensional schematic diagram of a cross-sectional structure of the valve core shown in FIG. 4 at another position.
Figure 7:
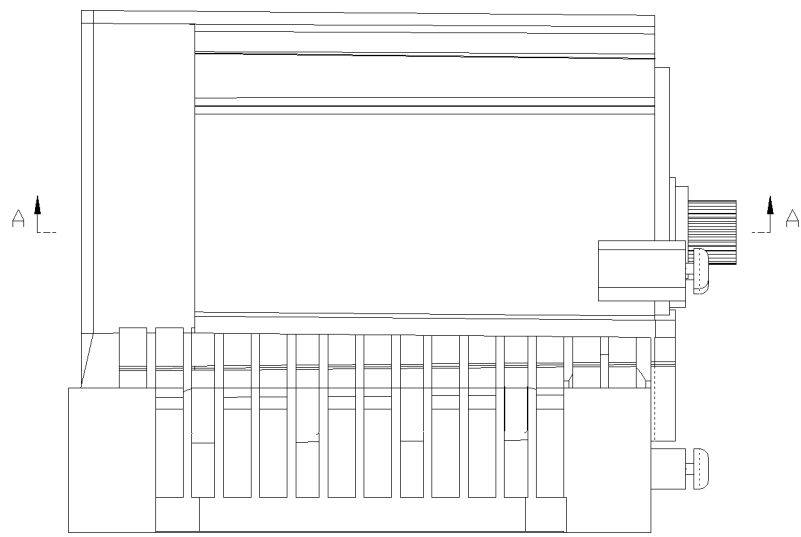
FIG. 7 is a structural schematic diagram of the control valve shown in FIG. 1 at a first perspective.

As shown in FIGS. 1 and 6, in some embodiments, the first partition 23 and the second partition 24 may be fixedly connected as an integrated structure through an injection molding process. In a case that the control valve 1 further includes the first seal 41, the first seal 41 is arranged between the valve core 20 and the side wall part 11. One surface, on one side of the first seal 41 in a thickness direction, of the first seal 41 contacts and is sealed with a surface of the second partition 24, and the other surface, on the other side of the first seal 41 in the thickness direction, of the first seal 41 contacts and is sealed with an inner surface of the side wall part 11.

Figure 8:
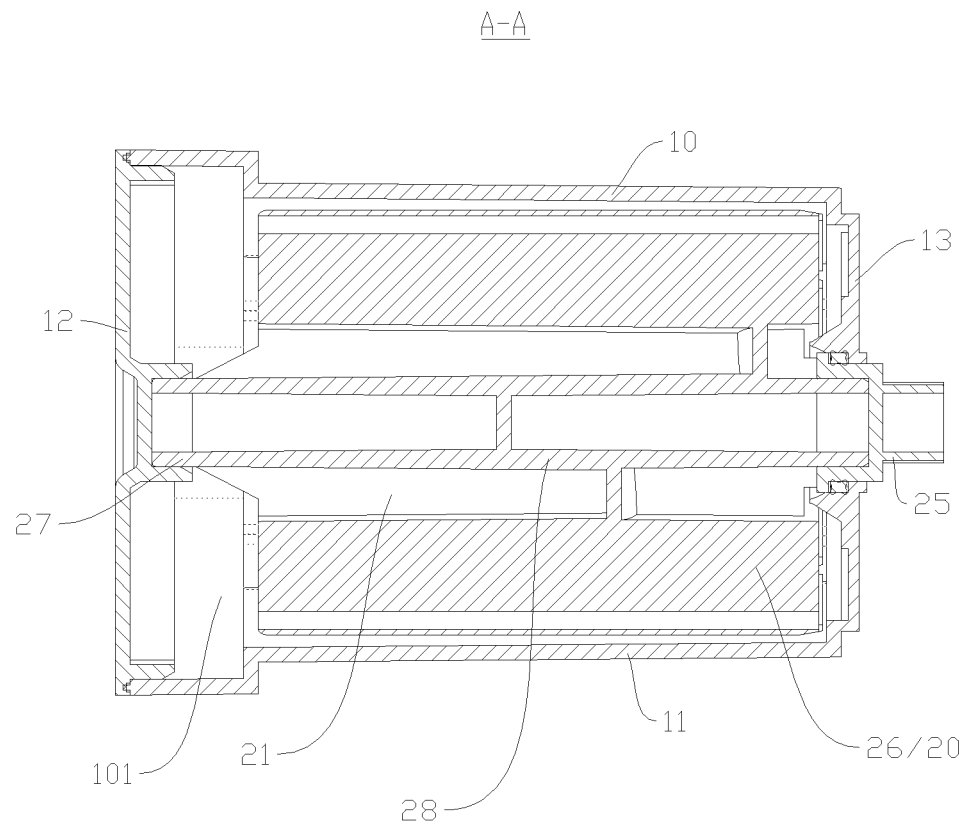
FIG. 8 is a schematic diagram of a cross-sectional structure along A-A direction in FIG. 7.
Figure 9:
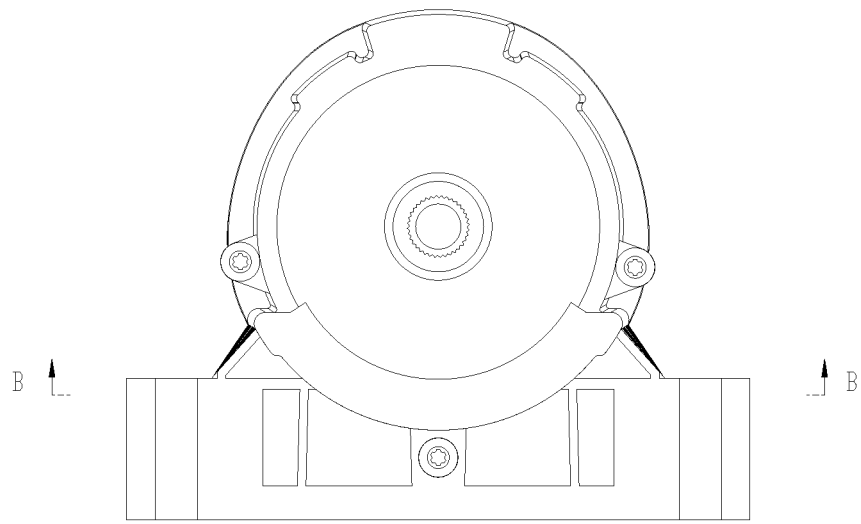
FIG. 9 is a structural schematic diagram of the control valve shown in FIG. 1 at a second perspective.
Figure 10:
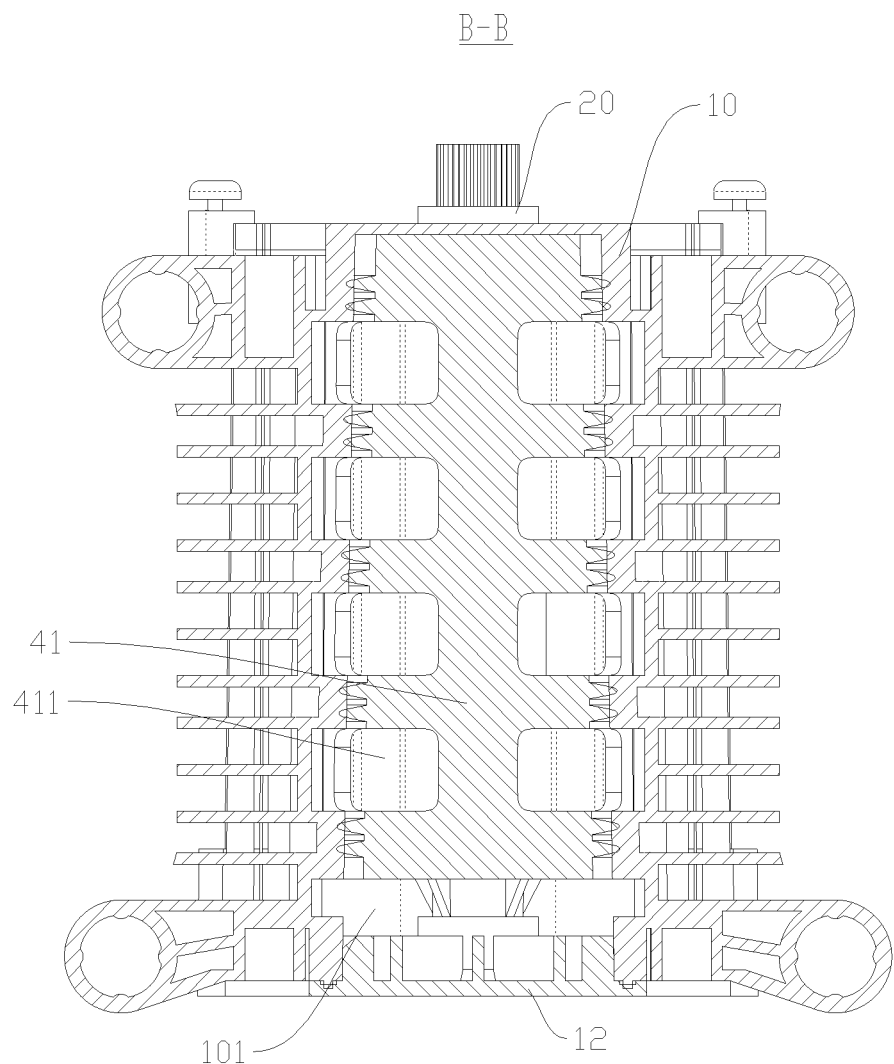
FIG. 10 is a schematic diagram of a cross-sectional structure along B-B direction in FIG. 9.
Figure 11:
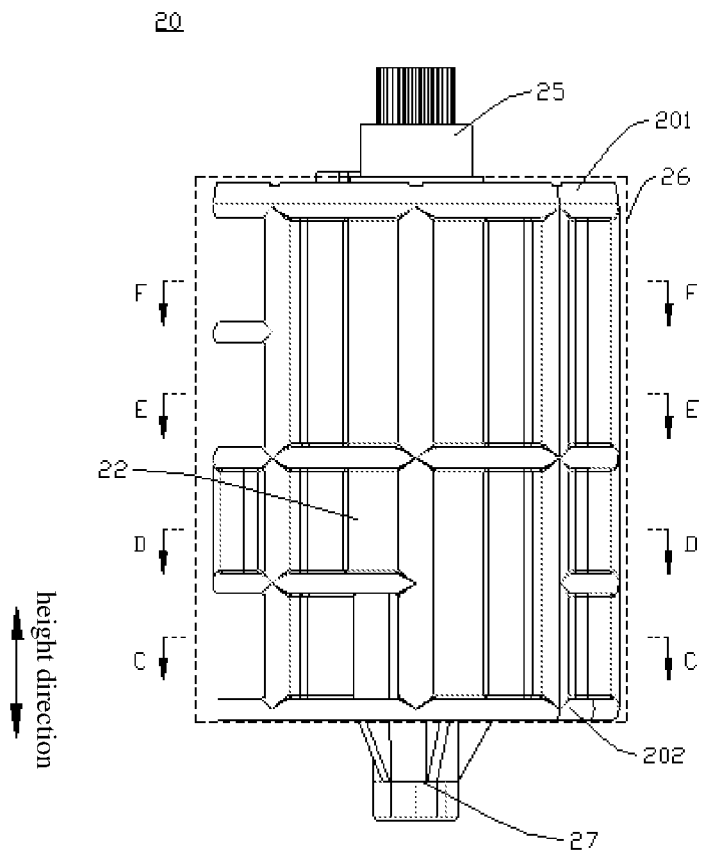
FIG. 11 is a structural schematic diagram of the valve core shown in FIG. 4 at a perspective.
Figure 12:
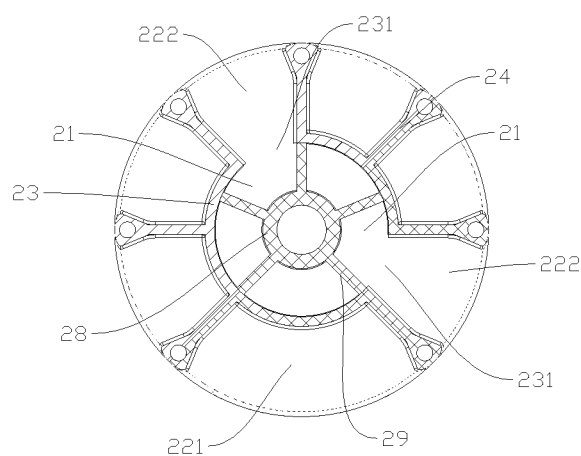
FIG. 12 is a schematic diagram of a cross-sectional structure along C-C direction in FIG. 11.
Figure 13:
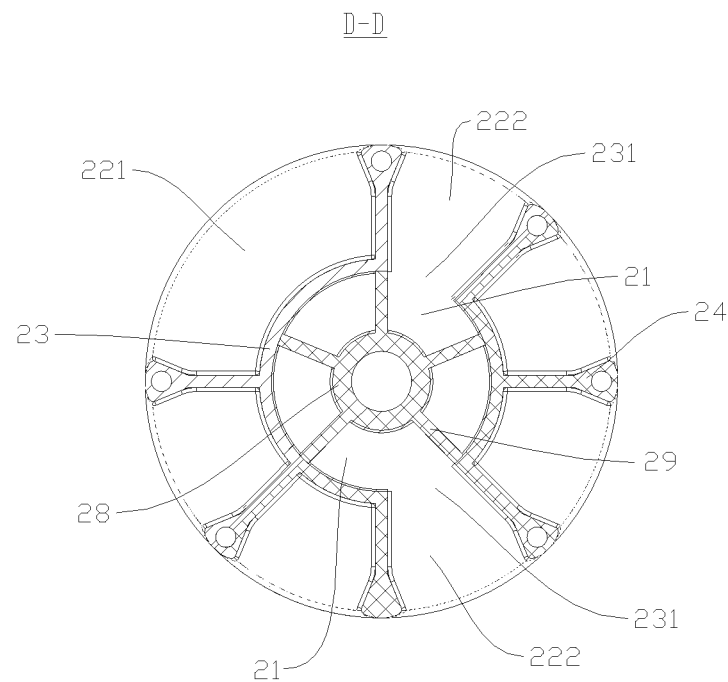
FIG. 13 is a schematic diagram of a cross-sectional structure along D-D direction in FIG. 11.
Figure 14:
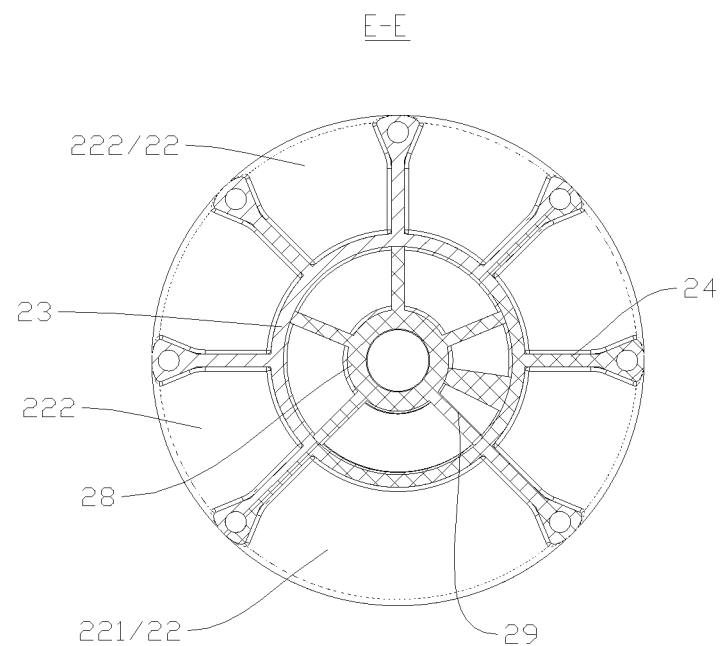
FIG. 14 is a schematic diagram of a cross-sectional structure along E-E direction in FIG. 11.
Figure 15:
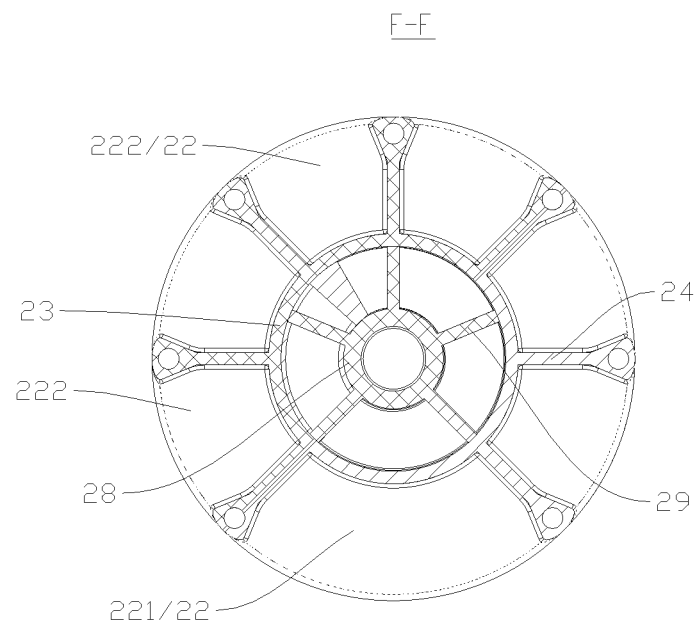
FIG. 15 is a schematic diagram of a cross-sectional structure along F-F direction in FIG. 11.

As shown in FIGS. 7 to 11, in some embodiments, the valve core 20 includes a transmission connection part 25, a communication part 26, and a support part 27. At least part of the transmission connection part 25 and the support part 27 are respectively arranged at both ends of the connection column 28. Along the height direction of the valve core 20, the communication part 26 is located between the transmission connection part 25 and the support part 27. In this way, the communication part 26 is a structure formed by the top plate 201, the bottom plate 202, and a component between the top plate 201 and the bottom plate 202. The transmission connection part 25 protrudes from the top plate 201 toward a direction away from the support part 27, and the support part 27 protrudes from the bottom plate 202 toward a direction away from the transmission connection part 25. The transmission connection part 25 and the support part 27 are connected to the valve body 10 in a position-limited manner, the transmission connection part 25 is connected to the top wall part 13 of the valve body 10 in a position-limited manner and is in transmission connection with the driving element in the driving device, and the support part 27 is connected to the bottom wall part 12 of the valve body 10 in a position-limited manner, so that the valve core 20 can rotate stably. The inner communication cavity 21 and the outer communication cavities 22 are located at the communication part 26. In FIG. 8, along an axial direction of the valve core 20, i.e. along the height direction of the valve core 20, there is a space between an end of the communication part 26 and the bottom wall part 12. In FIG. 10, in the case that the control valve includes the first seal 41, there is also a space between an end of the first seal 41 in the height direction of the first seal 41 and the bottom wall part 12.

As shown in FIGS. 1, 2, 8, and 10, the channels 30 of the control valve 1 includes a first flow channel 31. One end of the first flow channel 31 penetrates through the side wall part 11 to form a first communication port 311, and the other end of the first flow channel 31 forms a first valve port 312. The first communication port 311 is located at an end of the side wall part 11 in a height direction of the side wall part 11. The communication part 26 of the valve core 20 and the first communication port 311 are arranged along the height direction of the side wall part 11. In FIGS. 2, 8, and 10, along the height direction of the side wall part 11, the first communication port 311 is located between the bottom plate 202 and the bottom wall part 12, that is, the first communication port 311 is located in an area between an end of the communication part 26 and the bottom wall part 12, and the first communication port 311 is also located in an area between an end of the first seal 41 and the bottom wall part 12. In any one of working modes of the valve core 20, the first valve port 312 communicates with the inner communication cavity 21 through the first communication port 311, the valve cavity 101, that is, at any rotation angle of the valve core 20, fluid flowing into the control valve from the first valve port 312 directly enters the valve cavity 101 through the first communication port 311, and flows into the inner communication cavity 21 from the valve cavity 101.

Figure 4:
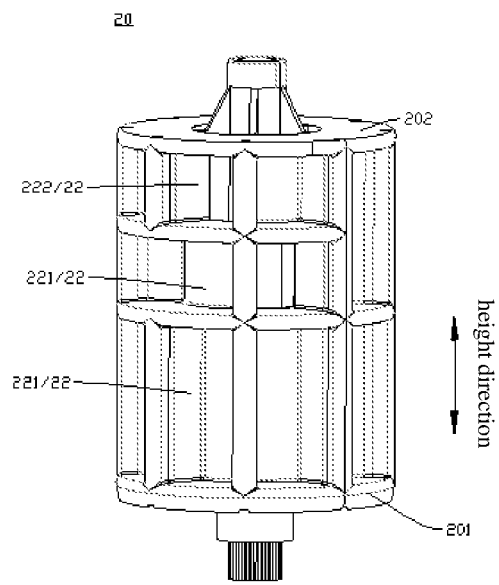
FIG. 4 is a three-dimensional structural schematic diagram of a valve core of the control valve shown in FIG. 1.

As shown in FIGS. 1, 3, and 4, in some embodiments, the channels 30 of the control valve 1 further includes multiple second flow channels 32. One end of each of the second flow channels 32 penetrates through the side wall part 11 to form a second communication port 321, and the other end of each of the second flow channels 32 forms a second valve port 322. The second communication port 321 is located between the bottom plate 202 and the top plate 201 along the height direction of the side wall part 11, and a position where the second communication port 321 is located corresponds to a position where the outer communication cavity 22 is located, thereby facilitating fluid communication between the outer communication cavity 22 and the second communication port 321. The outer communication cavity 22 includes multiple first cavities 221 and multiple second cavities 222. A longitudinal cross-sectional area of a cavity mouth of each first cavity 221 is greater than or equal to twice a longitudinal cross-sectional area of a cavity mouth of each second cavity 222 along the height direction of the valve core 20. The first cavity 221 is configured to correspond to two second valve ports 322, and the second cavity 222 is configured to correspond to one second valve port 322. The two second valve ports 322 corresponding to the first cavity 221 are communicated through one first cavity 221 and the second communication port 321 by rotation of the valve core 20. Part of the second cavities 222 communicate with the inner communication cavity 21 through the communication hole 231. The first valve port 312 is communicated with the second valve port 322 corresponding to the second cavity 222 through the inner communication cavity 21, the communication hole 231, and the second cavity 222 by rotation of the valve core 20.

Further referring to FIGS. 11 to 15, four layers of outer communication cavities 22 may be formed in the valve core 20 along the height direction of the valve core 20. In a direction from the bottom plate 202 to the top plate 201 in FIG. 11, a first layer of outer communication cavities, a second layer of outer communication cavities, a third layer of outer communication cavities, and a fourth layer of outer communication cavities are provided. In an area where the first layer of outer communication cavities is located, the first partition 23 has two communication holes 231 that are spaced apart, each communication hole 231 communicates with the second cavity 222 in the corresponding outer communication cavity 22, and the remaining outer communication cavities 22 are separated from the inner communication cavity 21 into independent spaces through the first partition 23. In an area where the second layer of outer communication cavities is located, the first partition 23 has two communication holes 231 that are spaced apart, each communication hole 231 communicates with the second cavity 222 in the corresponding outer communication cavity 22, and the remaining outer communication cavities 22 are separated from the inner communication cavity 21 into independent spaces by the first partition 23. The communication hole 231 located in the area where the second layer of outer communication cavities is located and the communication hole 231 located in the area where the first layer of outer communication cavities is located are staggered from each other along a circumferential direction of the valve core 20 and separated by the second partition 24. In areas where the third layer of outer communication cavities and the fourth layer of outer communication cavities are located, the first partition 23 does not have the communication hole 231, and the outer communication cavities 22 and the inner communication cavity 21 located in the areas are separated into independent spaces by the first partition 23.

Figure 16:
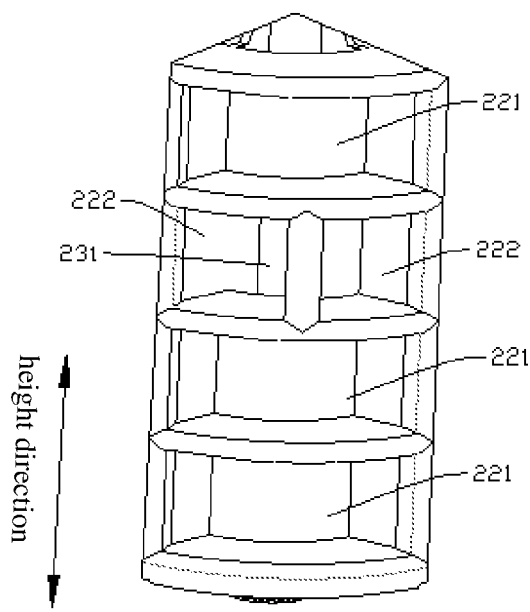
FIG. 16 is a three-dimensional structural schematic diagram of a first sector section of the valve core shown in FIG. 4.
Figure 17:
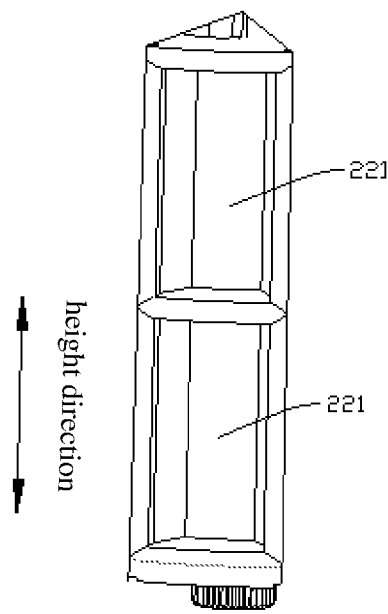
FIG. 17 is a three-dimensional structural schematic diagram of a second sector section of the valve core shown in FIG. 4.
Figure 18:
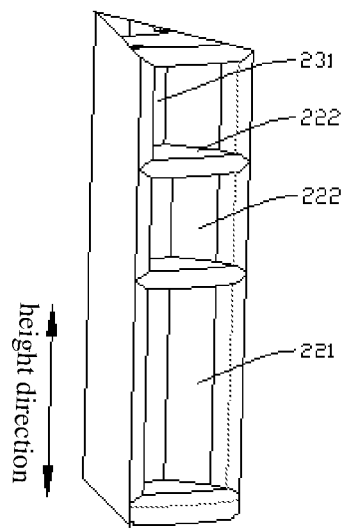
FIG. 18 is a three-dimensional structural schematic diagram of a third sector section of the valve core shown in FIG. 4.
Figure 19:
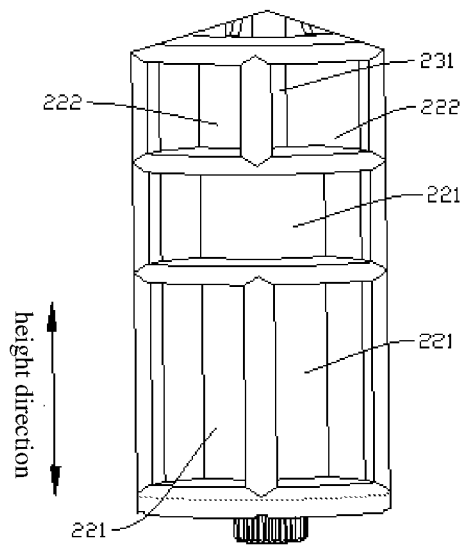
FIG. 19 is a three-dimensional structural schematic diagram of a fourth sector section of the valve core shown in FIG. 4.

Referring to FIGS. 4, 5, 11, and 16 to 19, in some embodiments, the valve core 20 is of a columnar structure. A length of the first cavity 221 is twice a length of the second cavity 222, and a width of the first cavity 221 is equal to a width of the second cavity 222. It should be noted that the length of the first cavity 221 refers to a length of a relatively long edge of a longitudinal section of the cavity mouth of the first cavity 221, the longitudinal cross-sectional area of each communication cavity (i.e. the first cavity 221 or the second cavity 222) is a cross-sectional area obtained by sectioning the valve core over edges of a peripheral wall on both sides of the communication cavity along a direction parallel to an axial direction of the valve core, this cross-sectional area can also be understood as an area of a projection surface obtained by an orthographic projection of the communication cavity along the radial direction, or this cross-sectional area can also be understood as an area of the cavity mouth of the communication cavity facing the second valve port 322. For example, in FIG. 16, the longitudinal section of the cavity mouth of the first cavity 221 is rectangular, the length of the first cavity 221 is a length of a rectangle, and the width of the first cavity 221 is a width of the rectangle. Similarly, the length of the second cavity 222 refers to a length of a relatively long edge of the longitudinal section of the cavity mouth of the second cavity 222, and the width of the second cavity 222 refers to a length of a relatively short edge of the longitudinal section of the cavity mouth of the second cavity 222. Along the circumferential direction of the valve core 20, the valve core 20 includes a first sector section SE1, a second sector section SE2, a third sector section SE3, and a fourth sector section SE4 that are of a sector cross section. As shown in FIG. 16, the first sector section SE1 is provided with three first cavities 221 and two second cavities 222. A width direction of the first cavity 221 is parallel to the height direction of the valve core 20, and the first partition 23 has the communication hole 231 at a position where a peripheral wall of the second cavity 222 is formed, and the inner communication cavity 21 communicates with one of the second cavities 222 through the communication hole 231. As shown in FIG. 17, along the height direction of the valve core 20, the second sector section SE2 is provided with two first cavities 221, and a length direction of the first cavity 221 is parallel to the height direction of the valve core 20. As shown in FIG. 18, along the height direction of the valve core 20, the third sector section SE3 is provided with a first cavity 221 and two second cavities 222. A length direction of the first cavity 221 is parallel to the height direction of the valve core 20. The first partition 23 has the communication hole 231 at a position where a peripheral wall of one of the two second cavities 222 is formed, and the inner communication cavity 21 communicates with one of the two second cavities 222 through the communication hole 231. As shown in FIG. 19, the fourth sector section SE4 is provided with three first cavities 221 and two second cavities 222. A length direction of one of the three first cavities 221 is parallel to the height direction of the valve core 20, and length directions of the other two first cavities 221 are perpendicular to the height direction of the valve core 20. The first partition 23 has the communication hole 231 at a position where a peripheral wall of one of the two second cavities 222 is formed, and the inner communication cavity 21 communicates with the second cavity 222 through the communication hole 231. Through the above arrangement, when the valve core 20 is rotated to different angles, different valve ports can be communicated through different communication cavities to form various flow paths.

Figure 20:
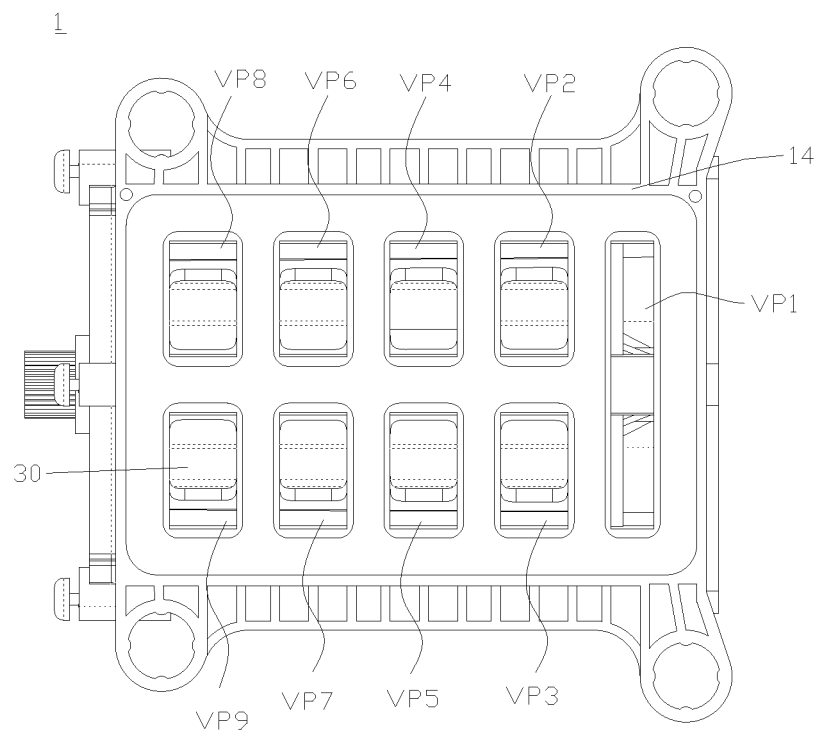
FIG. 20 is a structural schematic diagram of the control valve shown in FIG. 1 at a third perspective.
Figure 21:
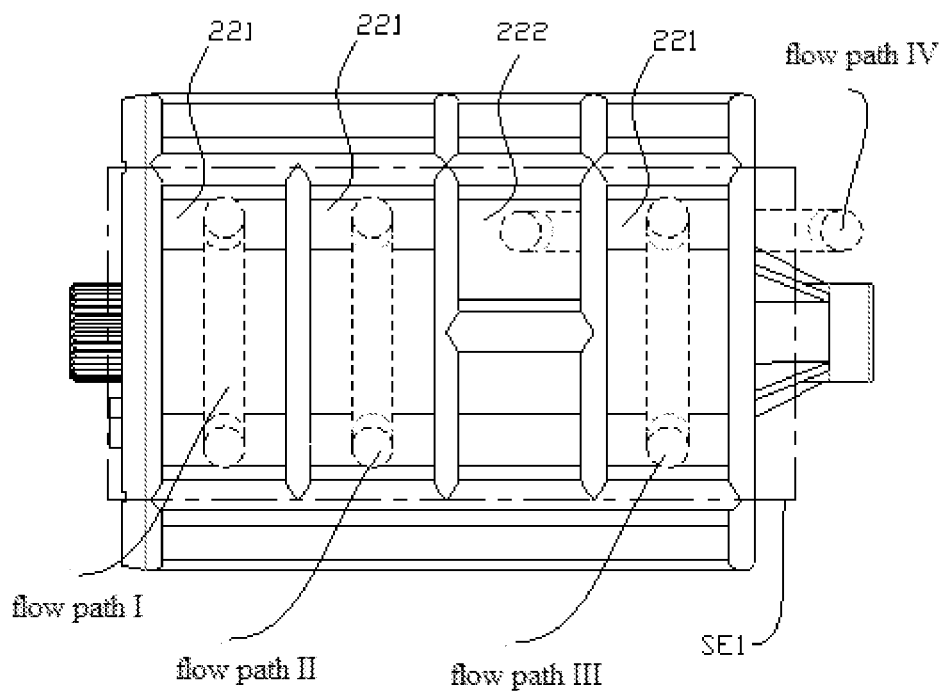
FIG. 21 is a schematic diagram of a position of a valve core and a flow-through position of flow paths of the control valve shown in FIG. 1 in a first working mode.
Figure 22:
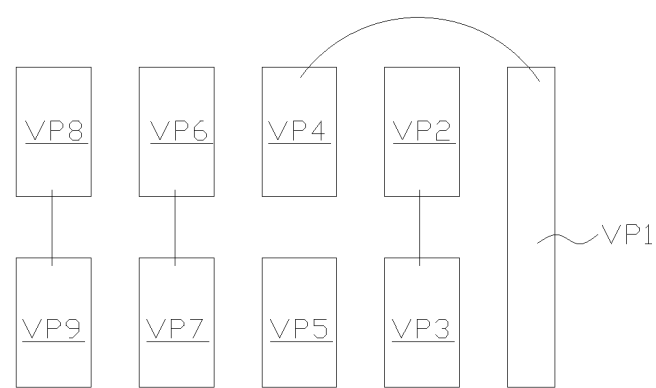
FIG. 22 is a schematic block diagram of a communication mode of valve ports of the control valve shown in FIG. 1 in a first working mode.

As shown in FIG. 20, in some embodiments, the control valve 1 includes nine channels 30, and the valve ports formed by the nine channels 30 are respectively defined as a first valve port VP1 (first valve port 312) located at the first flow channel 31, a second valve port VP2, a third valve port VP3, a fourth valve port VP4, a fifth valve port VP5, a sixth valve port VP6, a seventh valve port VP7, an eighth valve port VP8, and a ninth valve port VP9 that are located at the second flow channels 32, the control valve 1 at least has any one of the following four working modes:

In a first working mode, as shown in FIGS. 21 and 22, the valve core 20 is rotated to a position where an area, where the first sector section SE1 is located, corresponds to the valve ports, the first valve port VP1 communicates with the fourth valve port VP4 through the valve cavity, the inner communication cavity 21, the communication hole 231, and the second cavity 222 to form a flow path IV. One of the three first cavities 221 communicates the second valve port VP2 with the third valve port VP3 to form a flow path III. Another one of the three first cavities 221 communicates the sixth valve port VP6 with the seventh valve port VP7 to form a flow path IV The third one of the three first cavities 221 communicates the eighth valve port VP8 with the ninth valve port VP9 to form a flow path I, and the fifth valve port VP5 is in a cut-off state. Herein, connection lines in the block diagrams represent schematic connection lines that communicate two valve ports.

Figure 23:
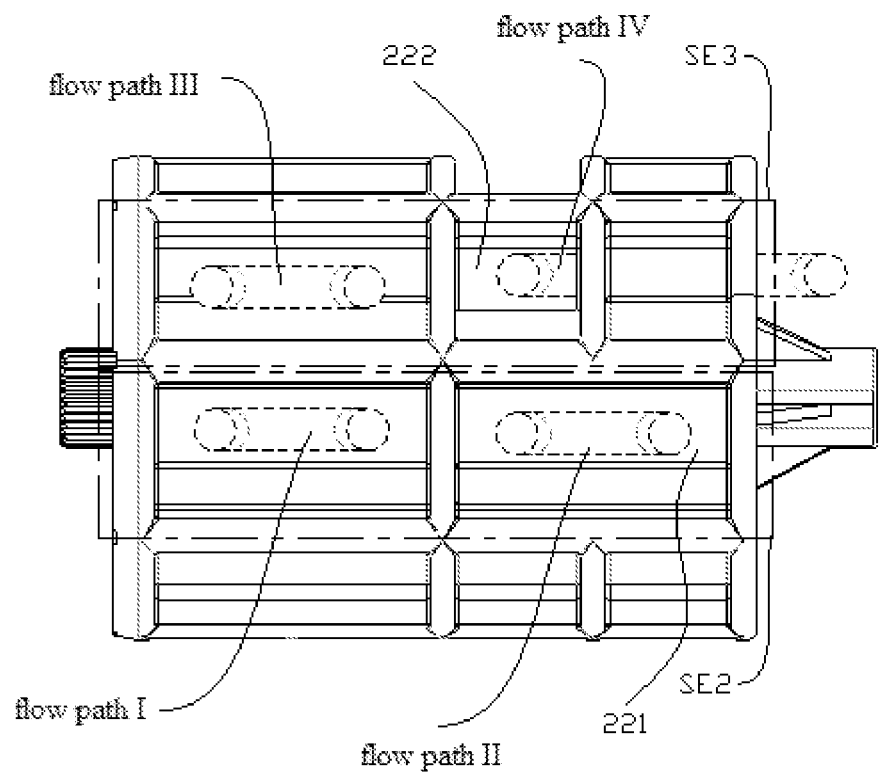
FIG. 23 is a schematic diagram of a position of a valve core and a flow-through position of flow paths of the control valve shown in FIG. 1 in a second working mode.
Figure 24:
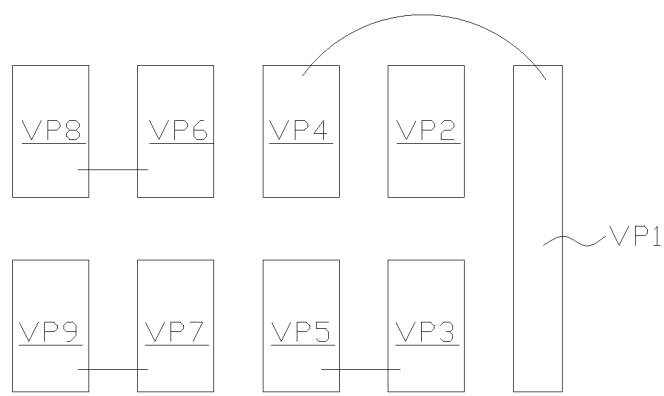
FIG. 24 is a schematic block diagram of a communication mode of valve ports of the control valve shown in FIG. 1 in a second working mode.

In a second working mode, as shown in FIGS. 23 and 24, the valve core 20 is rotated to a position where an area, where a set of adjacent the second sector section SE2 and the third sector section SE3 are located, corresponds to the valve ports. In an area where the second sector section SE2 is located, one of the two first cavities 221 communicates the seventh valve port VP7 with the ninth valve port VP9 to form a flow path I, and the other one of the two first cavities 221 communicates the third valve port VP3 with the fifth valve port VP5 to form a flow path II. In an area where the third sector section SE3 is located, the first cavity 221 communicates the sixth valve port VP6 with the eighth valve port VP8 to form a flow path III, and the first valve port VP1 communicates with the fourth valve port VP4 through the inner communication cavity 21, the communication hole 231, and one of the second cavities 222. The second valve port VP2 is in a cut-off state.

Figure 25:
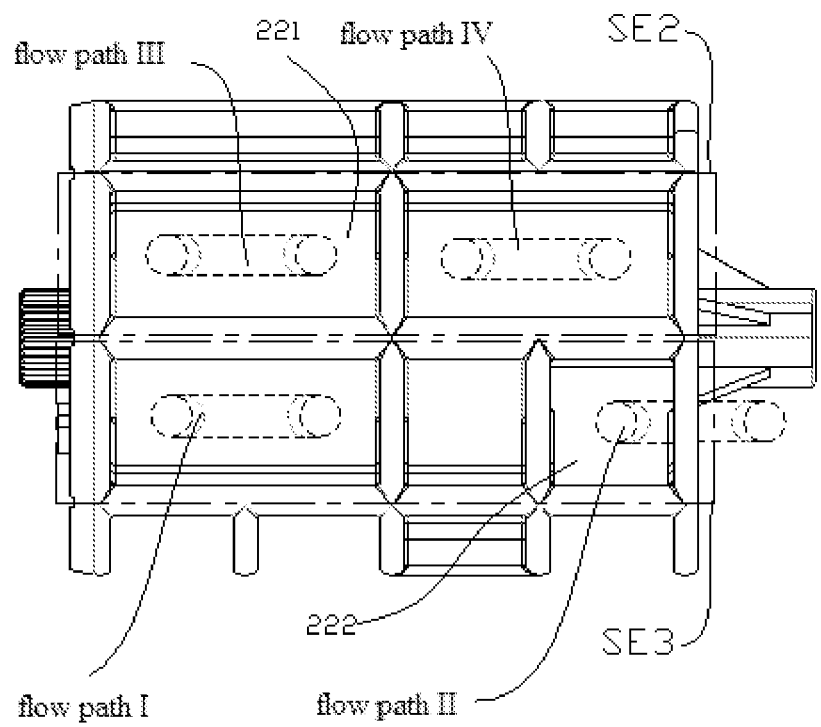
FIG. 25 is a schematic diagram of a position of a valve core and a flow-through position of flow paths of the control valve shown in FIG. 1 in a third working mode.
Figure 26:
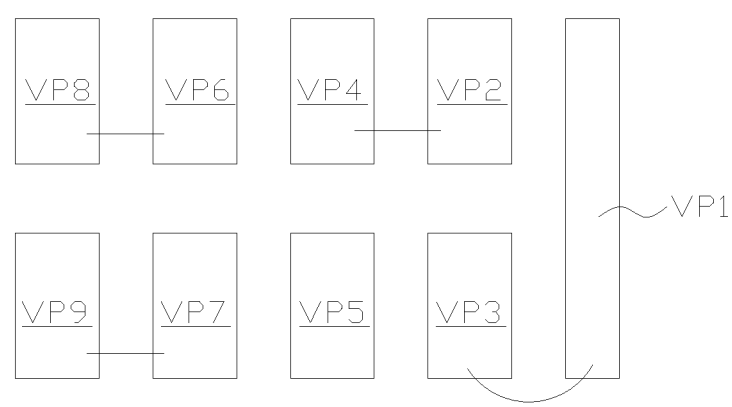
FIG. 26 is a schematic block diagram of a communication mode of valve ports of the control valve shown in FIG. 1 in a third working mode.

In a third working mode, as shown in FIGS. 25 and 26, the valve core 20 is rotated to a position where an area, where another set of adjacent the second sector section SE2 and the third sector section SE3 are located, corresponds to the valve ports. In an area where the second sector section SE2 is located, one of the two first cavities 221 communicates the eighth valve port VP8 with the sixth valve port VP6 to form a flow path III, and the other one of the two first cavities 221 communicates the fourth valve port VP4 with the second valve port VP2 to form a flow path IV. In an area where the third sector section SE3 is located, the first cavity 221 communicates the ninth valve port VP9 with the seventh valve port VP7 to form a flow path I, and the first valve port VP1 communicates with the third valve port VP3 through the inner communication cavity 21, the communication hole 231, and one of the two second cavities 222 to form a flow path II. The fifth valve port VP5 is in a cut-off state.

Figure 27:
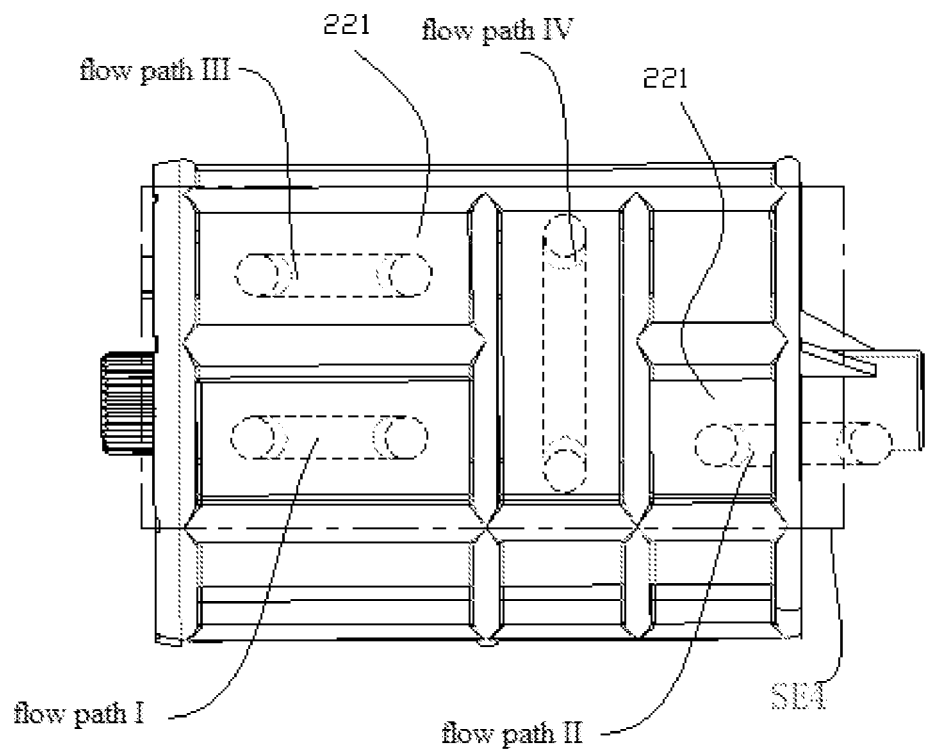
FIG. 27 is a schematic diagram of a position of a valve core and a flow-through position of flow paths of the control valve shown in FIG. 1 in a fourth working mode.
Figure 28:
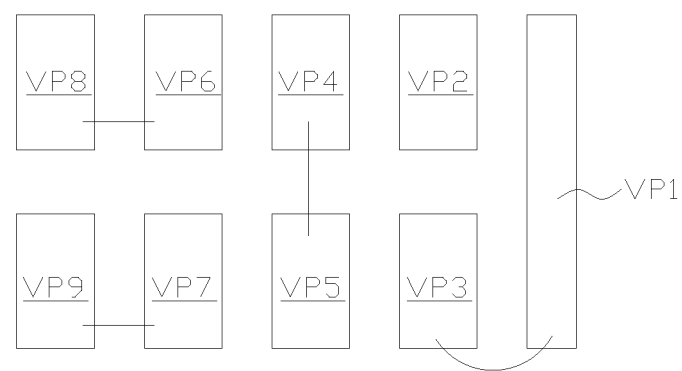
FIG. 28 is a schematic block diagram of a communication mode of valve ports of the control valve shown in FIG. 1 in a fourth working mode.

In a fourth working mode, as shown in FIGS. 27 and 28, the valve core 20 is rotated to a position where an area, where the fourth sector section SE4 is located, corresponds to the valve ports. The first valve port VP1 communicates with the third valve port VP3 through the inner communication cavity 21, the communication hole 231, and the second cavity 222 to form a flow path II, one of the three first cavities 221 communicates the eighth valve port VP8 with the sixth valve port VP6 to form a flow path III, another one of the three first cavities 221 communicates the ninth valve port VP9 with the seventh valve port VP7 to form a flow path I, and the third one of the three first cavities 221 communicates the fourth valve port VP4 with the fifth valve port VP5 to form a flow path IV, and the second valve port VP2 is in a cut-off state.

Through the above arrangement, in the case that the control valve 1 has nine valve ports, four fluid paths and at least one closed path can be formed. Compared with a previous multi-channel valve structure that cannot allow a single valve port to be cut-off, the control valve 1 according to the embodiments of the present application can perform a working mode in which a single valve port is cut off during the rotation of the valve core.

Figure 29:
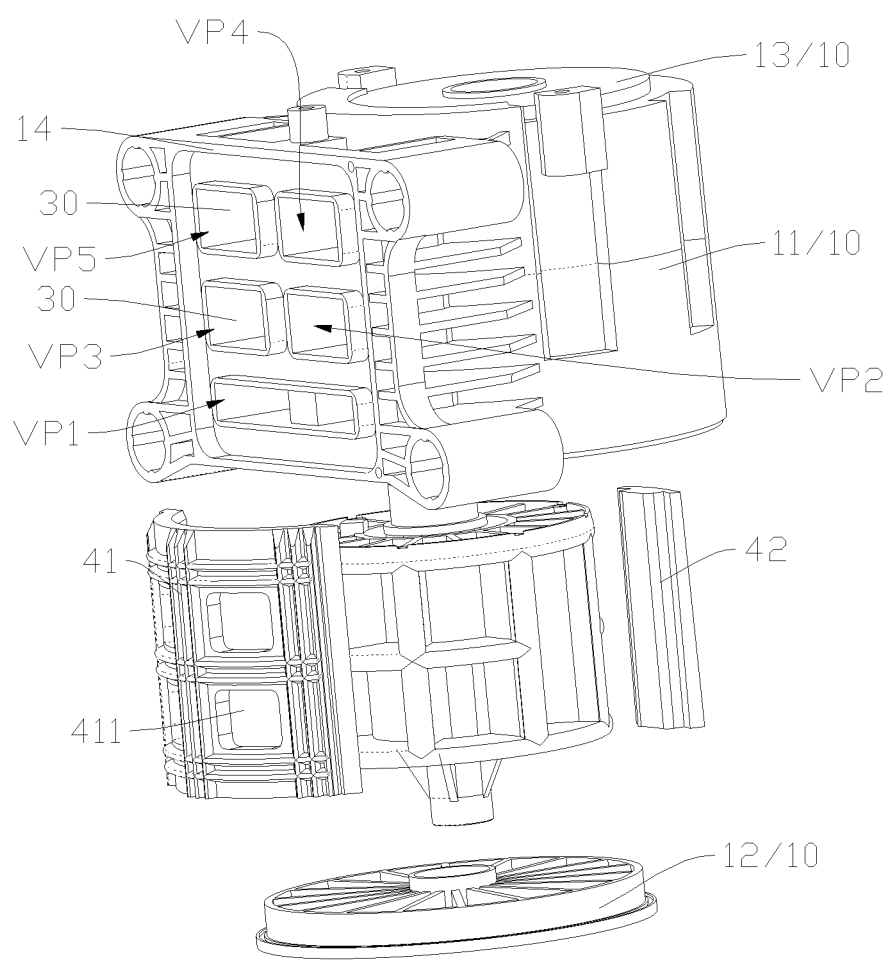
FIG. 29 is a schematic diagram of an explosive structure of a control valve provided according to a second embodiment of the present application.
Figure 30:
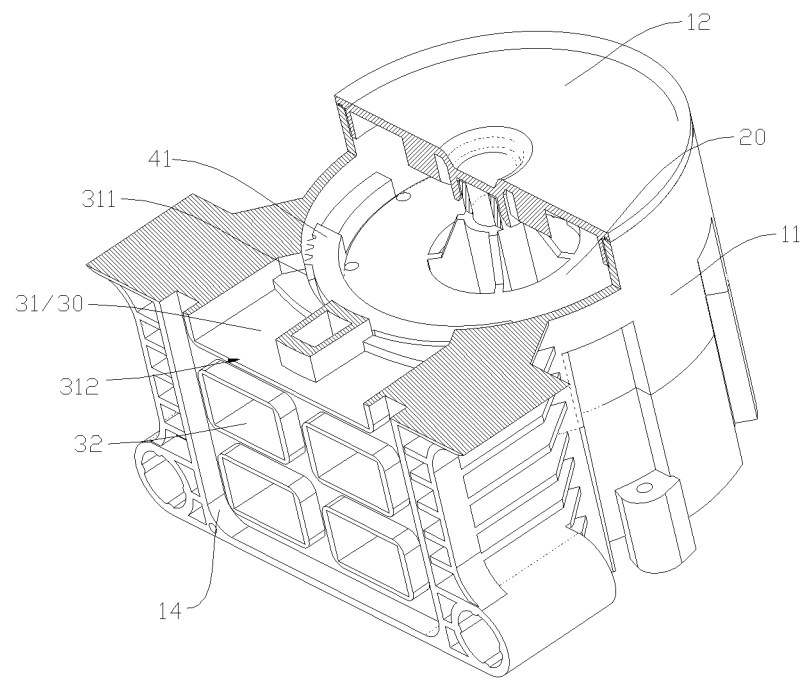
FIG. 30 is a partial cross-sectional view of the control valve shown in FIG. 29 at a position.
Figure 31:
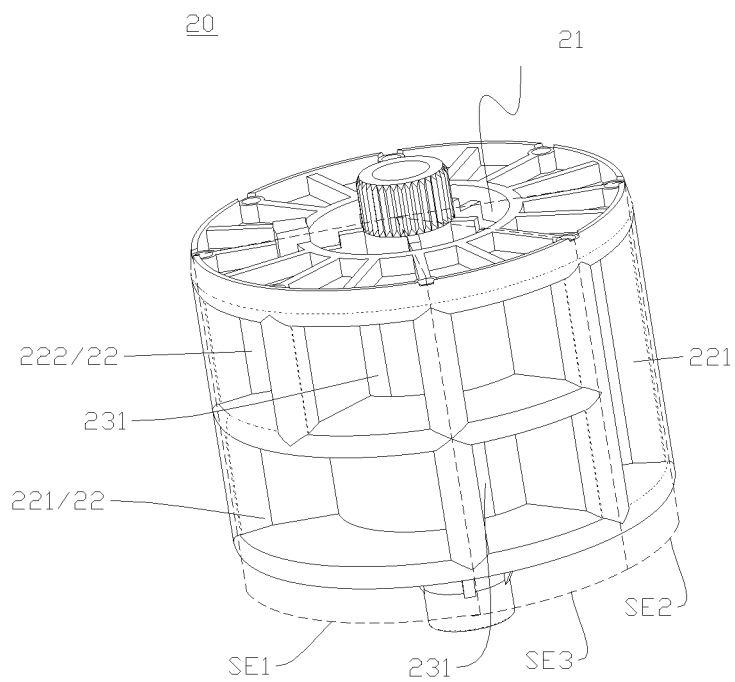
FIG. 31 is a three-dimensional structural schematic diagram of a valve core of the control valve shown in FIG. 29.

FIGS. 29 to 31 are the structural schematic diagrams of a control valve 1 according to a second embodiment of the present application. A structure of the control valve 1 is similar to the structure of the control valve according to the first embodiment, and the control valve 1 includes a valve body 10, a valve core 20, a first seal 41, a second seal 42, a driving device (not shown in the figure) and other structures. The control valve 1 has multiple channels 30, and the channel 30 has a first flow channel 31 and multiple second flow channels 32. An end of the first flow channel 31 penetrates through the side wall part 11 of the valve body to form a first communication port 311. The first communication port 311 is located at an end of the side wall part 11 in the height direction of the side wall part 11. The difference is that the control valve 1 according to the second embodiment has five valve ports, and correspondingly, the structure of the valve core 20 is correspondingly different. The valve core 20 according to the embodiment of the present application is described below.

As shown in FIG. 31, in some embodiments, the valve core 20 is of a columnar structure. A length of the first cavity 221 is twice a length of the second cavity 222, and a width of the first cavity 221 is equal to a width of the second cavity 222. The valve core 20 includes a first sector section SE1, a second sector section SE2, and a third sector section SE3 that are of a sector cross section along a circumferential direction of the valve core 20. The first sector section SE1 is provided with a first cavity 221 and two second cavities 222. A width direction of the first cavity 221 is parallel to the height direction of the valve core 20, and the first partition 23 has a communication hole 231 at a position where a peripheral wall of one of the two second cavities 222 is formed. The inner communication cavity 21 communicates with the second cavity 222 through the communication hole 231. The second sector section SE2 is provided with a first cavity 221 along the height direction of the valve core 20, and a length direction of the first cavity 221 is parallel to the height direction of the valve core 20. The third sector section SE3 is provided with two second cavities 222 along the height direction of the valve core 20. The first partition 23 has a communication hole 231 at a position where a peripheral wall of one of the two second cavities 222 is formed, and the inner communication cavity 21 communicates with one of the second cavities 222 through the communication hole 231. The number of the first sector sections SE1, the number of the second sector sections SE2, and the number of the third sector sections SE3 may be set according to the needs of the user.

Figure 32:
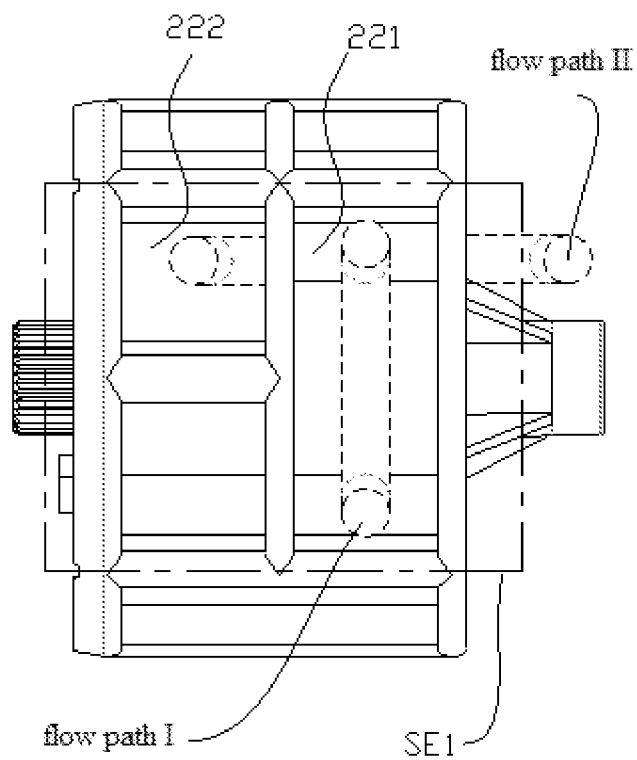
FIG. 32 is a schematic diagram of a position of a valve core and a flow-through position of flow paths of the control valve shown in FIG. 29 in a first working mode.
Figure 33:
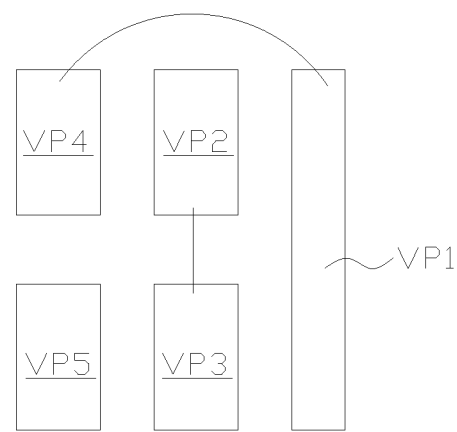
FIG. 33 is a schematic block diagram of a communication mode of valve ports of the control valve shown in FIG. 29 in a first working mode.
Figure 34:
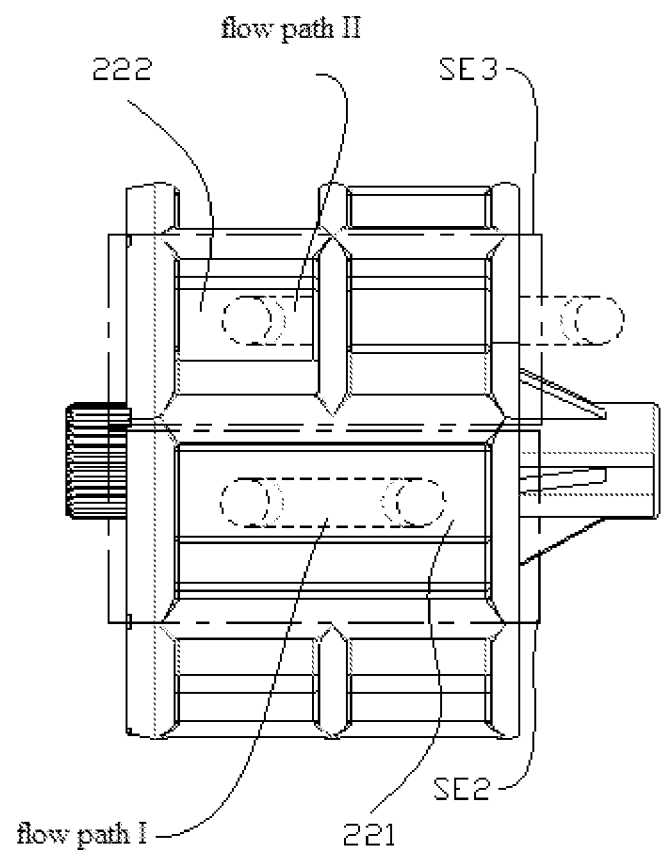
FIG. 34 is a schematic diagram of a position of a valve core and a flow-through position of flow paths of the control valve shown in FIG. 29 in a second working mode.
Figure 35:
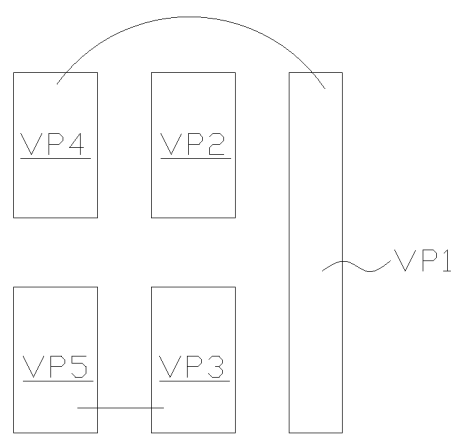
FIG. 35 is a schematic block diagram of a communication mode of valve ports of the control valve shown in FIG. 29 in a second working mode.
Figure 36:
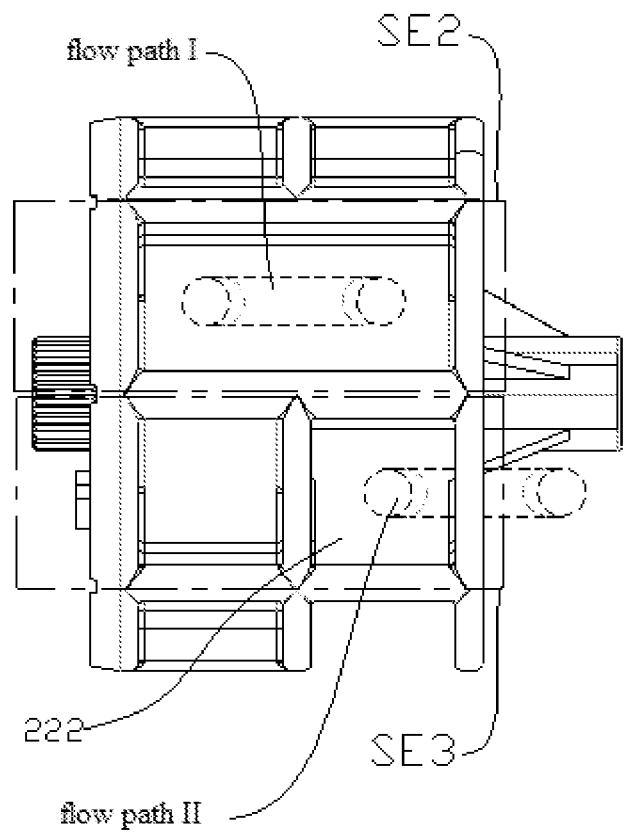
FIG. 36 is a schematic diagram of a position of a valve core and a flow-through position of flow paths of the control valve shown in FIG. 29 in a third working mode.
Figure 37:
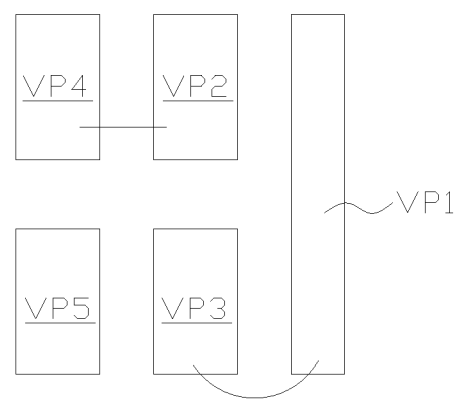
FIG. 37 is a schematic block diagram of a communication mode of valve ports of the control valve shown in FIG. 29 in a third working mode.
Figure 38:
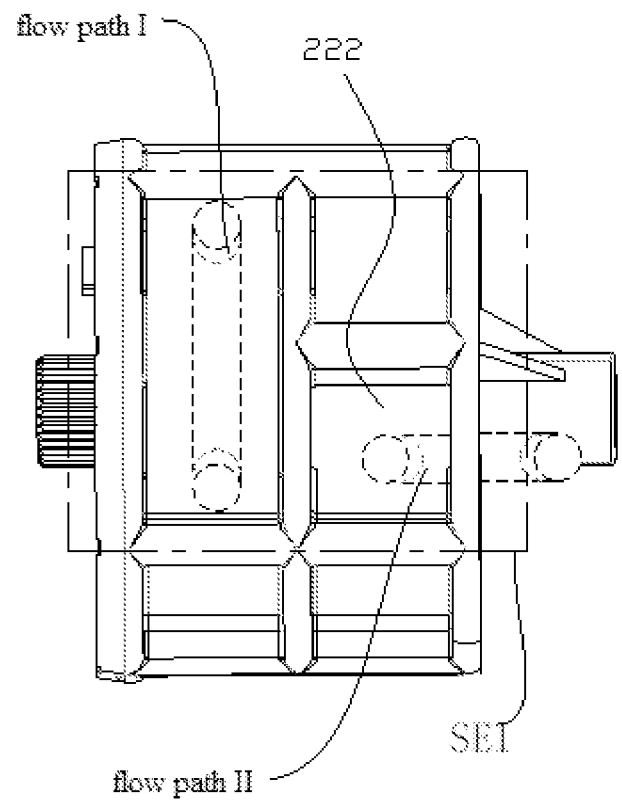
FIG. 38 is a schematic diagram of a position of a valve core and a flow-through position of flow paths of the control valve shown in FIG. 29 in a fourth working mode.
Figure 39:
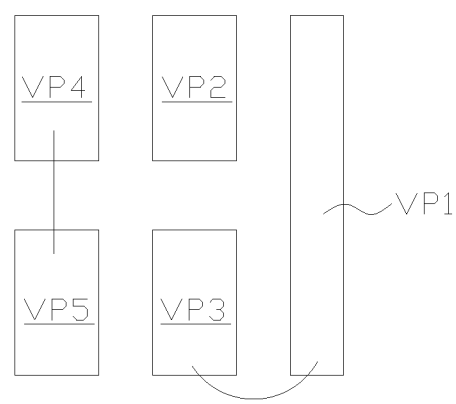
FIG. 39 is a schematic block diagram of a communication mode of valve ports of the control valve shown in FIG. 29 in a fourth working mode.

As shown in FIGS. 29 and 30, in some embodiments, the control valve 1 has five channels 30, and valve ports formed by the five channels 30 are a first valve port VP1 located at the first flow channel 31, a second valve port VP2, a third valve port VP3, a fourth valve port VP4, and a fifth valve port VP5 located at the second flow channels 32. The control valve 1 at least has any one of the following four working modes. In a first working mode, as shown in FIGS. 32 and 33, the valve core 20 is rotated to a position where an area, where one of the first sector sections SE1 is located, corresponds to the valve ports, the first valve port VP1 communicates with the fourth valve port VP4 through the inner communication cavity 21, the communication hole 231, and the second cavity 222 to form a flow path II, the first cavity 221 communicates the second valve port VP2 with the third valve port VP3 to form a flow path I, and the fifth valve port VP5 is in a cut-off state. In a second working mode, as shown in FIGS. 34 and 35, the valve core 20 is rotated to a position where an area, where a set of adjacent the second sector section SE2 and the third sector section SE3 are located, corresponds to the valve ports, the first cavity 221 communicates the third valve port VP3 with the fifth valve port VP5 to form a flow path I in an area where the second sector section SE2 is located, the first valve port VP1 communicates with the fourth valve port VP4 through the inner communication cavity 21, the communication hole 231 and one of the second cavities 222 to form a flow path II in an area where the third sector section SE3 is located, and the second valve port VP2 is in a cut-off state. In a third working mode, as shown in FIGS. 36 and 37, the valve core 20 is rotated to a position where an area where another set of adjacent the second sector section SE2 and the third sector section SE3 are located corresponds to the valve ports, the first cavity 221 communicates the second valve port VP2 with the fourth valve port VP4 to form a flow path I in an area where the second sector section SE2 is located, the first valve port VP1 communicates with the third valve port VP3 through the inner communication cavity 21, the communication hole 231 and one of the second cavities 222 to form a flow path II in an area where the third sector section SE3 is located, and the fifth valve port VP5 is in a cut-off state. In a fourth working mode, as shown in FIGS. 38 and 39, the valve core 20 is rotated to a position where an area where another of the first sector sections SE1 is located corresponds to the valve ports, the first valve port VP1 communicates with the third valve port VP3 through the inner communication cavity 21, the communication hole 231, and one of the second cavities 222 to form flow path II, the first cavity 221 communicates the fourth valve port VP4 with the fifth valve port VP5 to form a flow path I, and the second valve port VP2 is in a cut-off state.

The number of the valve ports of the control valve 1 according to the embodiments of the present application may not be limited to five or nine, but may also be more, such as six, seven, eleven, twelve, or thirteen. The specific number may be set according to the needs of the user. Based on the control valve 1 according to the embodiments of the present application, in some embodiments, the control valve 1 has 2n+1 channels 30 and 2n+1 valve ports, the control valve 1 can form n flow paths communicating two valve ports through the inner communication cavity 21 and the outer communication cavities 22 of the valve core 20, and allow at least one of the valve ports to be in a cut-off state through the first partition 23 and the second partition 24 of the valve core 20. Compared with a previous multi-channel valve structure that cannot allow a single valve port to be cut-off, the control valve 1 according to the embodiments of the present application can perform a working mode in which a single valve port is closed during the rotation of the valve core.

In summary, according to the control valve 1 provided by the embodiments of the present application, the valve core 20 includes the inner communication cavity 21, the multiple outer communication cavities 22, the first partition 23, and the second partition 24. The first partition 23 is located between the inner communication cavity 21 and the outer communication cavities 22, so that the inner communication cavity 21 and the outer communication cavities 22 are separated. The first partition 23 has the communication hole 231, so that the inner communication cavity 21 communicates with part of the outer communication cavities 22. The second partition 24 is located between two adjacent outer communication cavities 22 to separate each outer communication cavity 22 into an independent space. In the implementation of the present application, corresponding two second valve ports 322 can be communicated or cut off through the outer communication cavity 22 by rotation of the valve core 20, and/or, the corresponding two valve ports can be communicated or cut off through the inner communication cavity 21, the communication hole 231, and the outer communication cavity 22 by rotation of the valve core 20. In this way, the control valve 1 can allow the multiple valve ports to have different communication modes, multiple flow paths can be controlled by using one control valve 1, and the installation is simple and convenient for a fluid system, which is convenient for popularization and application.

It should be noted that the above embodiments are only used to illustrate the present application and not to limit the technical solutions described in the present application, For example, definitions for directions such as "front", "back", "left", "right", "up", "down". Although this specification has described the present application in detail with reference to the above embodiments, it should be understood that those skilled in the art can still modify, combine or replace the present application, all technical solutions and improvements thereof that do not deviate from the spirit and the scope of the present application shall fall within the scope of the claims of the present application.

What is claimed is:

1. A control valve comprising a valve body and a valve core, wherein
the valve body comprises a side wall part, the control valve has a valve cavity, the side wall part is a peripheral wall of the valve cavity or at least part of the peripheral wall of the valve cavity, at least part of the valve core is arranged in the valve cavity and is configured to be driven to rotate, the control valve has at least five channels, one end of each of the at least five channels penetrates through the side wall part, the other end of each of the at least five channels forms a valve port of the control valve, the valve core comprises an inner communication cavity, a plurality of outer communication cavities, a first partition, and a second partition, the plurality of outer communication cavities are distributed on an outer side of the inner communication cavity, the first partition is located between the inner communication cavity and the plurality of outer communication cavities, and the second partition is located between two adjacent outer communication cavities and isolates the plurality of the outer communication cavities;

the first partition has a communication hole, and the inner communication cavity communicates with part of the plurality of outer communication cavities through the communication hole; and the at least five channels of the control valve comprises a first flow channel and a plurality of second flow channels, the first flow channel is configured to communicate with the plurality of outer communication cavities through the inner communication cavity and the communication hole, and the plurality of second flow channels are configured to communicate with the plurality of outer communication cavities.

2. The control valve according to claim 1, wherein the control valve has 2n+1 channels and 2n+1 valve ports, the control valve is configured to form n flow paths communicating with at least two of the valve ports through the inner communication cavity and the plurality of outer communication cavities of the valve core, and allow at least one of the valve ports to be in a cut-off state through the first partition and the second partition of the valve core.

3. The control valve according to claim 2, wherein the valve core further comprises a connection column and a connection rib, the inner communication cavity is formed between an outer surface of the connection column and an inner surface of the first partition, and the connection rib is connected between the outer surface of the connection column and the inner surface of the first partition.

4. The control valve according to claim 2, wherein
the first partition and the second partition are fixedly connected to form an integrated structure through an injection molding process;
the control valve further comprises a first seal and a second seal, wherein the first seal is arranged between the valve core and the side wall part, and a surface on one side of the first seal in a thickness direction of the first seal contacts and is sealed with a surface of the second partition, a surface on the other side of the first seal in the thickness direction of the first seal contacts and is sealed with an inner surface of the side wall part, the second seal is arranged between the valve core and the side wall part, and the second seal and the first seal are respectively arranged on both sides of the valve core in a radial direction of the valve core.

5. The control valve according to claim 1, wherein the valve core comprises a transmission connection part, a communication part, and a support part, the communication part is located between the transmission connection part and the support part along a height direction of the valve core, the transmission connection part and the support part are limitedly connected to the valve body, the inner communication cavity and the plurality of outer communication cavities are formed in the communication part; and
one end of the first flow channel penetrates through the side wall part to form a first communication port, the other end of the first flow channel forms a first valve port, the first communication port is located at an end of the side wall part in a height direction of the side wall part, and the communication part of the valve core and the first communication port are arranged along the height direction of the side wall part.

6. The control valve according to claim 5, wherein in any working mode of the valve core, the first valve port communicates with the inner communication cavity through the first communication port and the valve cavity.

7. The control valve according to claim 5, wherein one end of each of the plurality of second flow channels penetrates through the side wall part to form a second communication port, and the other end of each of the plurality of second flow channels forms a second valve port, along the height direction of the side wall part, a position where the second communication port is located corresponds to a position where the outer communication cavity is located.

8. The control valve according to claim 7, wherein the outer communication cavity comprises a plurality of first cavities and a plurality of second cavities, a longitudinal cross-sectional area of a cavity mouth of each of the plurality of first cavities is greater than or equal to twice a longitudinal cross-sectional area of a cavity mouth of each of the plurality of second cavities along the height direction of the valve core, and at least two second valve ports corresponding to the first cavity are communicated through the first cavity and the second communication port by rotation of the valve core; and
part of the plurality of second cavities communicate with the inner communication cavity through the communication hole, and the first valve port is communicated with the second valve port corresponding to the plurality of second cavities through the inner communication cavity, the communication hole, and the plurality of second cavities by the rotation of valve core.

9. The control valve according to claim 8, wherein a length of each of the plurality of first cavities is twice a length of each of the plurality of second cavities, and a width of the plurality of first cavities is equal to a width of each of the plurality of second cavities.

10. The control valve according to claim 8, wherein along a circumferential direction of the valve core, the valve core comprises a first sector section, a second sector section, a third sector section, and a fourth sector section that are of a sector cross section; wherein
the first sector section is provided with three first cavities and two second cavities, wherein a width direction of each of the three first cavities is parallel to the height direction of the valve core, the first partition has the communication hole at a position where a peripheral wall of the second cavity is formed, and the inner communication cavity communicates with one of the two second cavities through the communication hole;
the second sector section is provided with two first cavities, wherein a length direction of each of the two first cavities is parallel to the height direction of the valve core;
the third sector section is provided with a first cavity and two second cavities, wherein a length direction of the first cavity is parallel to the height direction of the valve core, the first partition has the communication hole at a position where a peripheral wall of one of the two second cavities is formed, and the inner communication cavity communicates with one of the two second cavities through the communication hole; and
the fourth sector section is provided with three first cavities and two second cavities, wherein a length direction of one of the three first cavities is parallel to the height direction of the valve core, and length directions of the other two first cavities of the three first cavities are perpendicular to the height direction of the valve core, the first partition has the communication hole at a position where a peripheral wall of one of the two second cavities is formed, and the inner communication cavity communicates with the second cavity through the communication hole.

11. The control valve according to claim 10, wherein the control valve has nine channels, and the valve ports formed by the nine channels are respectively defined as a first valve port located at the first flow channel, a second valve port a third valve port, a fourth valve port, a fifth valve port, a sixth valve port, a seventh valve port, an eighth valve port, and a ninth valve port that are located at the plurality of second flow channels, the control valve at least has any one of the following four working modes:

in a first working mode, the valve core is rotated to a position where an area where the first sector section is located corresponds to the valve ports, the first valve port communicates with the fourth valve port through the inner communication cavity, the communication hole, and the second cavity, one of the three first cavities communicates the second valve port with the third valve port, and another one of the three first cavities communicates the sixth valve port with the seventh valve port, the third one of the three first cavities communicates the eighth valve port with the ninth valve port;

in a second working mode, the valve core is rotated to a position where an area, where a set of adjacent the second sector section and the third sector section are located, corresponds to the valve ports; in an area where the second sector section is located, one of the two first cavities communicates the seventh valve port with the ninth valve port, and the other one of the two first cavities communicates the third valve port with the fifth valve port; and in an area where the third sector section is located, the first cavity communicates the sixth valve port with the eighth valve port, and the first valve port communicates with the fourth valve port through the inner communication cavity, the communication hole, and one of the two second cavities;

in a third working mode, the valve core is rotated to a position where an area where another set of adjacent the second sector section and the third sector section are located corresponds to the valve ports;

in an area where the second sector section is located, one of the two first cavities communicates the eighth valve port with the sixth valve port, and the other one of the two first cavities communicates the fourth valve port with the second valve port; and in an area where the third sector section is located, the first cavity communicates the ninth valve port with the seventh valve port, and the first valve port communicates with the third valve port through the inner communication cavity, the communication hole, and one of the two second cavities; and in a fourth working mode, the valve core is rotated to a position where an area where the fourth sector section is located corresponds to the valve ports, the first valve port communicates with the third valve port through the inner communication cavity, the communication hole, and one of the two second cavities, one of the three first cavities communicates the eighth valve port with the sixth valve port, another one of the three first cavities communicates the ninth valve port with the seventh valve port, and the third one of the three first cavities communicates the fourth valve port with the fifth valve port.

12. The control valve according to claim 11, wherein
in the first working mode and the third working mode, the fifth valve port is in a cut-off state; and
in the second working mode and the fourth working mode, the second valve port is in a cut-off state.

13. The control valve according to claim 10, wherein
the first partition and the second partition are fixedly connected to form an integrated structure through an injection molding process;
the control valve further comprises a first seal and a second seal, wherein the first seal is arranged between the valve core and the side wall part, and a surface on one side of the first seal in a thickness direction of the first seal contacts and is sealed with a surface of the second partition, a surface on the other side of the first seal in the thickness direction of the first seal contacts and is sealed with an inner surface of the side wall part, the second seal is arranged between the valve core and the side wall part, and the second seal and the first seal are respectively arranged on both sides of the valve core in a radial direction of the valve core.

14. The control valve according to claim 8, wherein the valve core is of a columnar structure, a length of each of the plurality of first cavities is twice a length of each of the plurality of second cavities, a width of each of the plurality of first cavities is equal to a width of each of the plurality of second cavities, and along a circumferential direction of the valve core, the valve core comprises a first sector section, a second sector section, and a third sector section that are of a sector cross section; wherein the first sector section is provided with a first cavity and two second cavities, wherein a width direction of the first cavity is parallel to the height direction of the valve core, the first partition has the communication hole at a position where a peripheral wall of one of the two second cavities is formed, and the inner communication cavity communicates with one of the two second cavities through the communication hole;

the second sector section has a first cavity, and a length direction of the first cavity is parallel to the height direction of the valve core; and the third sector section has two second cavities, and the first partition has the communication hole at a position where a peripheral wall of one of the two second cavities is formed, and the inner communication cavity communicates with one of the two second cavities through the communication hole.

15. The control valve according to claim 14, wherein the control valve has five channels, and the valve ports formed by the five channels are respectively defined as a first valve port located at the first flow channel, a second valve port, a third valve port, a fourth valve port, and a fifth valve port that are located at the plurality of second flow channels, the control valve at least has any one of the following four working modes:

in a first working mode is that the valve core is rotated to a position where an area where one of the first sector sections is located corresponds to the valve ports, the first valve port communicates with the fourth valve port through the inner communication cavity, the communication hole, and the second cavity, and the first cavity communicates the second valve port with the third valve port;

in a second working mode, the valve core is rotated to a position where an area where a set of adjacent the second sector section and the third sector section are located corresponds to the valve ports, the first cavity communicates the third valve port with the fifth valve port in an area where the second sector section is located, and in an area where the third sector section is located, the first valve port communicates with the fourth valve port through the inner communication cavity, the communication hole and one of the two second cavities;

in a third working mode, the valve core is rotated to a position where an area where another set of adjacent the second sector section and the third sector section are located corresponds to the valve ports, the first cavity communicates the second valve port with the fourth valve port in an area where the second sector section is located, and the first valve port communicates with the third valve port through the inner communication cavity, the communication hole and one of the two second cavities in an area where the third sector section is located,; and in a fourth working mode is that the valve core is rotated to a position where an area where another of the first sector sections is located corresponds to the valve ports, the first valve port communicates with the third valve port through the inner communication cavity, the communication hole, and one of the two second cavities, the first cavity communicates the fourth valve port with the fifth valve port.

16. The control valve according to claim 5, wherein the valve core further comprises a connection column and a connection rib, the inner communication cavity is formed between an outer surface of the connection column and an inner surface of the first partition, and the connection rib is connected between the outer surface of the connection column and the inner surface of the first partition.

17. The control valve according to claim 5, wherein
the first partition and the second partition are fixedly connected to form an integrated structure through an injection molding process;
the control valve further comprises a first seal and a second seal, wherein the first seal is arranged between the valve core and the side wall part, and a surface on one side of the first seal in a thickness direction of the first seal contacts and is sealed with a surface of the second partition, a surface on the other side of the first seal in the thickness direction of the first seal contacts and is sealed with an inner surface of the side wall part, the second seal is arranged between the valve core and the side wall part, and the second seal and the first seal are respectively arranged on both sides of the valve core in a radial direction of the valve core.

18. The control valve according to claim 1, wherein the valve core further comprises a connection column and a connection rib, the inner communication cavity is formed between an outer surface of the connection column and an inner surface of the first partition, and the connection rib is connected between the outer surface of the connection column and the inner surface of the first partition.

19. The control valve according to claim 1, wherein the valve body comprises a bottom wall part and a top wall part, the valve cavity is enclosed by the bottom wall part, the top wall part, and the side wall part, at least part of the side wall part is located between the top wall part and the bottom wall part, one of the bottom wall part and the top wall part is integrally formed with the side wall part, the other one of the bottom wall part and the top wall part and the side wall part are arranged in a sealed manner.

20. The control valve according to claim 1, wherein
the first partition and the second partition are fixedly connected to form an integrated structure through an injection molding process;
the control valve further comprises a first seal and a second seal, wherein the first seal is arranged between the valve core and the side wall part, and a surface on one side of the first seal in a thickness direction of the first seal contacts and is sealed with a surface of the second partition, a surface on the other side of the first seal in the thickness direction of the first seal contacts and is sealed with an inner surface of the side wall part, the second seal is arranged between the valve core and the side wall part, and the second seal and the first seal are respectively arranged on both sides of the valve core in a radial direction of the valve core.

\* \* \* \* \*